(12) United States Patent
Sievers et al.

(10) Patent No.: US 10,165,310 B2
(45) Date of Patent: Dec. 25, 2018

(54) TRANSCODING USING TIME STAMPS

(71) Applicant: Affirmed Networks, Inc., Acton, MA (US)

(72) Inventors: John Sievers, Lynnfield, MA (US); Paul Alexander, Lexington, MA (US); Srinivasan Venkatraman, Belmont, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 0 days.

(21) Appl. No.: 15/618,719

(22) Filed: Jun. 9, 2017

(65) Prior Publication Data

US 2017/0359601 A1    Dec. 14, 2017

Related U.S. Application Data

(60) Provisional application No. 62/348,348, filed on Jun. 10, 2016.

(51) Int. Cl.
| | |
|---|---|
| H04N 21/2343 | (2011.01) |
| H04N 9/804 | (2006.01) |
| H04N 21/43 | (2011.01) |
| H04N 21/4385 | (2011.01) |
| H04N 21/4402 | (2011.01) |

(52) U.S. Cl.
CPC ....... *H04N 21/2343* (2013.01); *H04N 9/8042* (2013.01); *H04N 21/234363* (2013.01); *H04N 21/4305* (2013.01); *H04N 21/4385* (2013.01); *H04N 21/4402* (2013.01)

(58) Field of Classification Search
CPC .................................................. H04N 21/2343
See application file for complete search history.

(56) References Cited

U.S. PATENT DOCUMENTS

| | | | |
|---|---|---|---|
| 7,746,927 B1 * | 6/2010 | Hamilton | H04N 19/115 375/240.02 |
| 2003/0061369 A1 | 3/2003 | Aksu et al. | |
| 2009/0232220 A1 | 9/2009 | Neff et al. | |

(Continued)

OTHER PUBLICATIONS

International Search Report and Written Opinion issued by the U.S. Patent and Trademark Office as International Searching Authority, issued in International Application No. PCT/US17/36763, dated Aug. 29, 2017 (10 pages).

(Continued)

*Primary Examiner* — James M Pontius
(74) *Attorney, Agent, or Firm* — Wilmer Cutler Pickering Hale and Dorr LLP

(57) ABSTRACT

Systems and methods of transcoding video sequences for delivery in a mobile network. A source video sequence including source video frames is received and a source video frame type associated with each of the source video frames is determined based on a differential between a composition time stamp (CTS) and a decoding time stamp (DTS) associated with each of the source video frames. A frame type ratio value for the target frame-types is calculated based on a longest mini-GOP length. A target frame size of each target video frame is determined based on the frame type ratio value and a target transcoding rate, and each of the target video frames in a target video track is encoded to the target frame size to form a target video sequence.

20 Claims, 12 Drawing Sheets

(56) References Cited

U.S. PATENT DOCUMENTS

| | | |
|---|---|---|
| 2013/0117418 A1 | 5/2013 | Mutton et al. |
| 2014/0304303 A1 | 10/2014 | Dalal et al. |
| 2015/0010020 A1* | 1/2015 | Aoki ................ H04N 19/70 370/474 |
| 2015/0281705 A1* | 10/2015 | Wang ............. H04N 19/1883 375/240.03 |
| 2018/0213225 A1* | 7/2018 | Shen ............... H04N 19/114 |

OTHER PUBLICATIONS

Schwarz, H. et al., "Analysis of Hierarchical B Pictures and MCTF", IEEE Int'l Conf. Multimedia and Expo, ICME, Jul. 2006 (4 pages).

* cited by examiner

TRANSCODING USING TIME STAMPS

CROSS-REFERENCE TO RELATED APPLICATIONS

This application claims priority to U.S. Provisional Application No. 62/348,348, filed Jun. 10, 2016, entitled "Transcoding Using Time Stamps," the contents of which are incorporated herein.

TECHNICAL FIELD

This invention relates generally to digital video transcoding. More specifically, this invention relates to a system and method for transcoding using time stamps.

BACKGROUND

MP4 (known as "MPEG-4 Part 14", or "ISO/IEC 14496-14:2003") is a multimedia container file format standard specified as a part of MPEG-4, It is used to store digital audio and video streams and other data such as subtitles and still images. Mainly designed for video storage, MP4 is also used by Internet Video websites to transfer video content in a pseudo-streaming fashion. That is, a video player downloads the dip and plays the video content as it becomes available.

Generating an MP4 file that can be streamed to an MP4 player is traditionally a two-step process. In the first step, an encoder may generate frames and record their sizes in a separate table. The generated frames may be mitten to an 'mdat' box in a temporary file or buffer. After all frames have been encoded, the encoder may then write metadata information to a 'moov' box. In the second step, the encoder may arrange the 'Moov' and 'mdat' boxes in a correct order for streaming. One of the problems with this traditional two step MP4 encoding process is that it cannot overlap transcoding, compression, optimization, or any other on-the-fly modification process with streaming and playback of the final result. One solution to the traditional two step MP4 encoding process is to predict the size of each frame of the target video stream based on the frame size in the 'moov' box of the source video stream, and generate a 'moov' box with these predicted sizes for target video frames. During the transcoding process, each frame is coded to exactly match the size specified in the 'moov' box so that the indices to the target frames match the location of the video payload data. However, this solution has the shortcoming that frame order is not analyzed in the source 'moov' box nor is it specified in the target 'moov' box so bidirectionally coded (B) frames cannot be included in the stream, and thus information from the way the source media was encoded is not applied to better optimize the encoding of the transcoded media.

SUMMARY OF THE INVENTION

Aspects of the present disclosure relate to systems and methods of transcoding video sequences for delivery in a mobile network. In some embodiments, a source video sequence is received, the source video sequence comprising a source video track, the source video track including source video frames and source video frame type associated with each of the source video frames is determined based on a differential between a composition time stamp (CTS) and a decoding time stamp (DTS) associated with each of the source video frames. In some embodiments, the source video frame types include at least one of: a bi-predictive picture frame (B-frame), a bi-predictive reference picture frame (B-REF frame), an intra-coded frame (I-frame), and a predicted frame (P-frame). In some embodiments, a target frame type associated with each of a plurality of target video frames in a target video track is determined based on the source video frame types. In some embodiments, a frame type ratio value for the target frame-types is calculated based on a longest mini-GOP length, a mini-GOP length associated with a number of B-frames and B-REF frames between a first video frame and a second video frame in the plurality of target video frames, the first video frame having a first frame type of a P-frame or an I-frame, and the second video frame having a second frame type of a P-frame or an I-frame. In some embodiments, a target frame size of each target video frame is determined based on the frame type ratio value and a target transcoding rate. In some embodiments, each of the target video frames in the target video track to the target frame size is encoded to form a target video sequence.

In some embodiments, the source video frame type includes a B-frame when the CTS associated with the source video frame is less than a maximum CTS, the maximum CTS associated with a highest CTS of a prior decoded source video frame, the source video frame is not a first decoded frame in a mini-GOP, or a difference between the CTS and a composition timestamp of a previous P-frame or I-frame is less than the difference between composition timestamps of the first video frame and the second video frame divided by 2. In some embodiments, the source video frame type includes a B-REF frame when the CTS associated with the source video frame is less than a maximum CTS, the source video frame is a first decoded frame in the mini-GOP, and the difference between the CTS and the composition timestamp of the previous P-frame or I-frame is greater than or equal to the difference between composition timestamps of the first video frame and the second video frame divided by 2. In some embodiments, the source video frame type includes an I-frame when the CTS associated with the source video frame is greater than the maximum CTS and the source video frame is a keyframe. In some embodiments, the source video frame type includes a P-frame when the CTS associated with the source video frame is greater than the maximum CTS and the source video frame is not a keyframe.

In some embodiments, when the CTS associated with the source video frame is greater than the highest CTS of a prior decoded source video frame, the maximum CTS is set equal to the CTS associated with the source video frame. In some embodiments, the frame type ratio value comprises at least one of a B-frame ratio value associated with a ratio of a B-frame size compared to a P-frame size, a B-REF frame ratio value associated with a ratio of a B-REF frame size compared to a P-frame size, and an I-frame ratio value associated with a ratio of an I-frame size compared to a P-frame size. In some embodiments, the mini-GOP length is inversely proportional to the B-frame ratio value. In some embodiments, the I-frame ratio value is 4, the B-frame ratio is 128/512 when the longest mini-GOP length is 0, the B-REF frame ratio is 128/512 when the longest mini-GOP length is 0, the B-frame ratio is 72/512 when the longest mini-GOP length is less than 4, the B-REF frame ratio is 179/512 when the longest mini-GOP length is less than 4, the B-frame ratio is 31/512 when the longest mini-GOP length is greater than or equal to 4, and the B-REF frame ratio is 128/512 when the longest mini-GOP length is greater than or equal to 4. In some embodiments, a number of bits to allocate to each of the target video frames of the target video track is determined prior to encoding of the target video frames in the target video track. In some embodiments, determining a number of bits to allocate to each target video frames of the target video track further comprises determining a number of bits in a P-frame in the target video frame, a number of bits in an I-frame in the target video frame, a number of bits in a B-frame in the target video frame, and a number of bits in a B-REF frame in the target video frame. In some embodiments, the number of bits in the P-frame is equal to $((n_I+n_P+n_B+n_{BREF})*bps)/(r_I*n_I+n_P+r_B*n_B+r_{BREF}*n_{BREF})*fps)$, wherein $n_I$ is a number of I-frames in at least one of the source video sequence and the target video sequence, $n_P$ is a number of P-frames in at least one of the source video sequence and the target video sequence, $n_B$ is a number of B-frames in at least one of the source video sequence and the target video sequence, $n_{BREF}$ is the number of B-REF frames in at least one of the source video sequence and the target video sequence, bps is the target encoding rate, and fps is a frame rate in frames per second for at least one of the source video sequence and the target video sequence. In some embodiments, the number of bits in the I-frame is equal to the number of bits in the P-frame multiplied by the I-frame ratio value. In some embodiments, the number of bits in the B-frame is equal to the number of bits in the P-frame multiplied by the B-frame ratio value. In some embodiments, the number of bits in the B-REF frame is equal to the number of bits in the P-frame multiplied by the B-REF frame ratio value.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In some embodiments, systems and methods described herein use out-of-order coding of video frames to increasingly build up quality through local pyramid structures of frames to yield higher quality video coding. Specifically, the techniques described herein in some embodiments incorporate high fidelity B-frame coding and hierarchical B-frame coding, and produce higher quality video transcoding for streaming video than can be produced when B-frame and hierarchical B-frame encoding is not used.

In some embodiments, the systems and methods described herein also use B-ref frames. A B-REF frame is a B-frame that is used as a reference frame for subsequent B-frames. This is opposed to other B-frames that are not used as a reference where quality can be lower since the bits are basically discarded by the decoder after the frame is displayed. By building a temporal pyramid of P-frames, B-REF frames, and B-frames where lower quality frames reference only higher quality frames, the overall quality of the sequence is improved while transmitting the minimum amount of information. The amount of information transmitted can be measured in bitrate using units such as bits/second. It is possible to either transmit a higher fidelity sequence at the same bitrate as a sequence coded without using this technique, or one can transmit the sequence at the same fidelity, but with a lower bitrate using the technique.

As part of the MP4 file format and embedded in the incoming video header, the Decode Time Stamp (DTS) indicates the relative time at which a video frame should be instantaneously removed from the receiver buffer and decoded. The Composition Time Stamp (CTS), which is also a part of the MP4 file format, indicates the relative time when the video frame was captured. As described in more detail below, in some embodiments, the video frame type of the frames in the source media stream can be determined based on the differential in timestamps between the DTS and the CTS.

Using this video frame type information as guidance, the systems and methods described herein can also, in some embodiments, can include determining the frame types of all the frames to be transcoded in the video sequence, allocate a fixed frame size to each frame based on its frame type, and scale these frame sizes to conform to the desired video frame rate and bit rate for the target video sequence. Frames can be encoded to the exact pre-determined size in bits, depending on the frame type, and multiple frames are kept in an internal queue so out-of-order encoding can take advantage of a temporal hierarchical pyramid structure to maximize temporal and spatial video quality.

Figure 1:
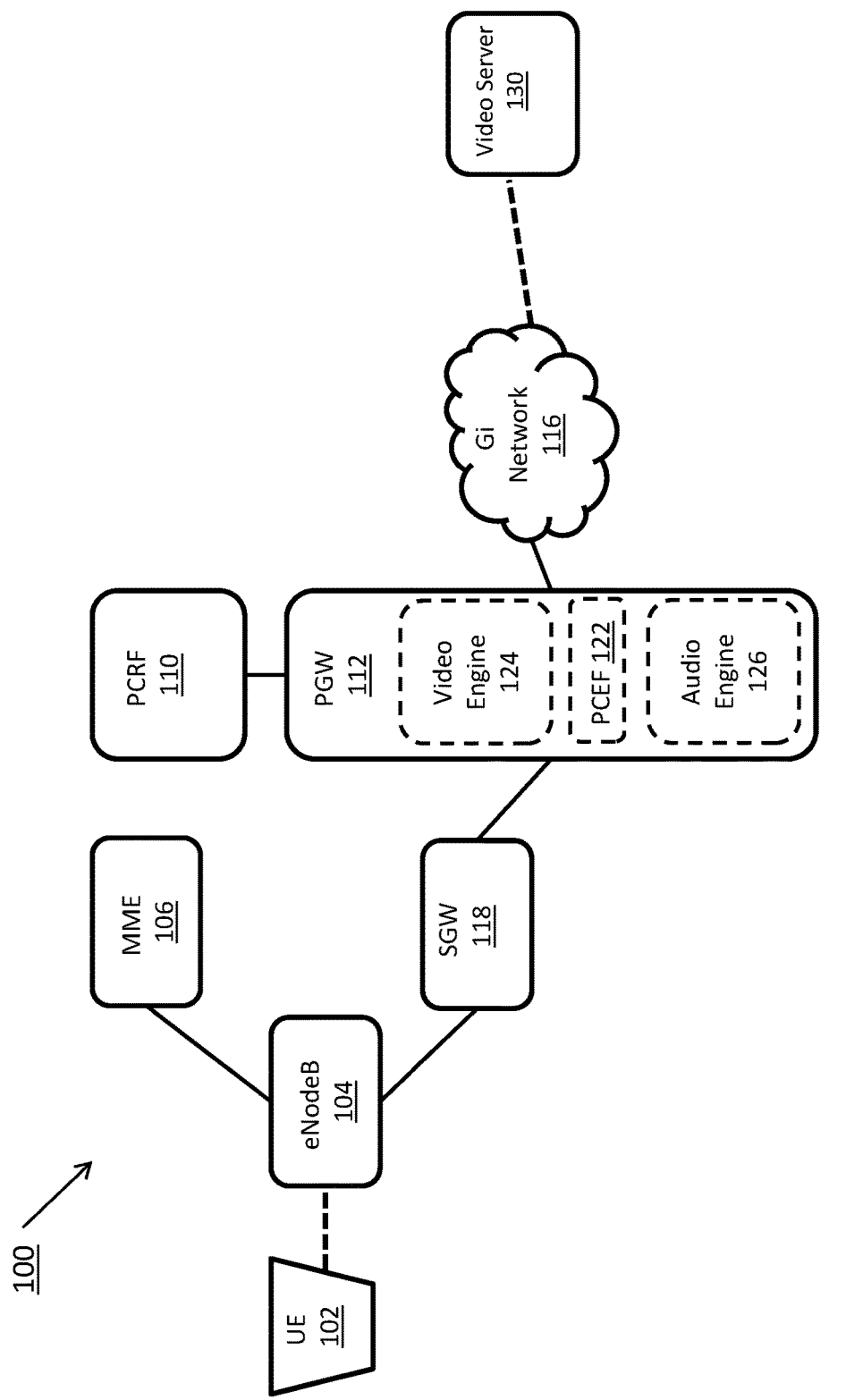
FIG. 1 is a system diagram showing a networked system, according to some embodiments of the present disclosure.

FIG. 1 is a system diagram showing a networked system 100, according to some embodiments. System 100 includes user equipment (UE) 102, evolved node B (eNodeB) 104, mobility management entity (MME) 106, serving gateway (SGW) module 108, policy and charging rules function (PCRF) 110, packet data network gateway (PGW) 112, gigabit wireless (Gi) network 116, policy and charging enforcement function (PCEF) 122, video engine 124 and video server 130.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 106 and SGW 108. Backhaul is a process of transferring packets or communication signals over relatively long distances to a separate location for processing. SGW 108 routes and forwards user data packets, while also acting as the mobility anchor for a user plane during inter-eNodeB handovers. MME 106 is a control node in the networked system 100. MME 106 handles the LTE related control plane signaling that also includes mobility and security functions for UE 102 that attaches to the LTE Radio network. MME 106 also handles UE being in idle mode, including support for tracking area management and paging procedures.

When a UE 102 attaches to the network, multiple control messages are exchanged between network elements in order to create a data session (e.g., a 4G session) and provide data connectivity to the UE 102. As explained above, eNodeB 104 can be backhauled to MME 106 and SGW 108. SGW 108 routes and forwards user packets to PGW 112. PGW 112 can act as a Policy Enforcement Point (PEP). PGW 112 communicates with PCRF 110, which can download policy information that is specific to a subscriber. PCRF acts as a Policy Decision Point (PDP).

PGW 112 includes a Policy Control Enforcement Function (PCEF) 122, video engine 124 and audio engine 126. As part of the job of the PCEF, the video and/or audio media may be regulated to restrict the bandwidth of the stream. The video engine (also referred to herein as a transcoding engine or video transcoding engine), as described in some embodiments herein, handles the transcoding of the video to a lower bandwidth stream as part of the PCEF. While the video engine is shown in the context of a mobile network in FIG. 1, the video engine and audio engine can be deployed in any network or situation where data (e.g., video data or audio data) is streamed to a device.

PGW 112 also provides UE 102 with connections to external packet data networks through Gi Network 116. As described in more detail below, UE 102 can request and receive video from a video server 130.

Figure 2:
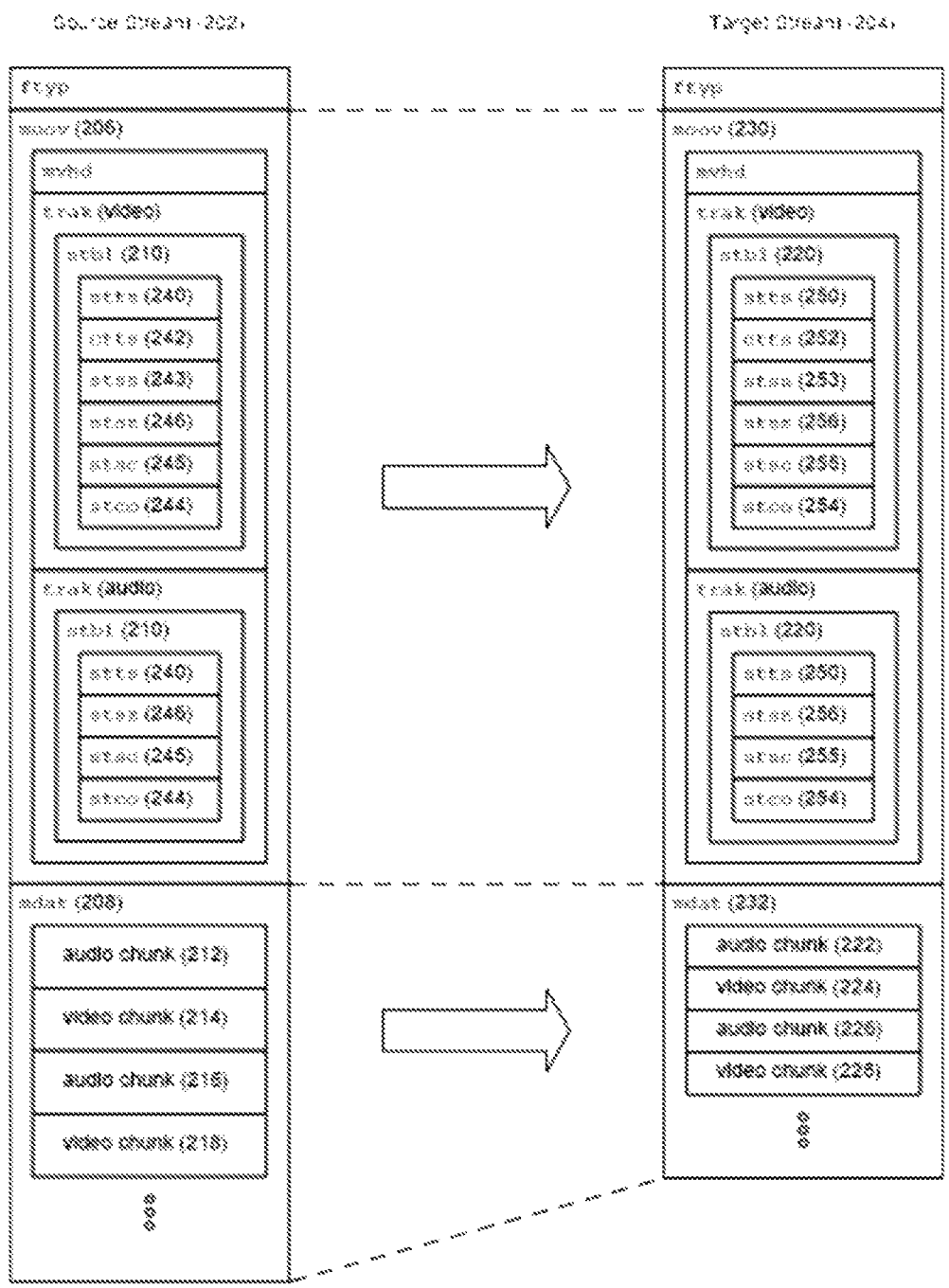
FIG. 2 is a diagram showing 'moov' and 'mdat' transcoding, according to some embodiments of the present disclosure.

FIG. 2 is a diagram depicting MP4 file organization for an example source stream to be transcoded and the transcoded target stream, according to some embodiments of the present disclosure. MP4 file contents are organized as a nested set of boxes, each of which has a four character code (fourcc) name. FIG. 2 shows source stream 202, target stream 204, source 'moov' box 206, source 'mdat' box 208, target 'moov' box 230, and target 'mdat' box 232.

Source 'moov' box 206 includes metadata, including frame ordering, frame sizes, and byte offsets, to extract, decode, and reconstruct in composition time order the actual compressed audio and video stream data stored in the source 'mdat' box 208. FIG. 2 shows a typical storage organization for audio and video frames within the 'mdat' box 208, wherein audio and video frames are aggregated into chunks which in turn are interleaved within the 'mdat' box 208 in such a way that audio and video frames which should be played back within the same time interval are stored in adjacent chunks. FIG. 2 illustrates the interleaving of the first two chunks of source audio 212 216 and the first two chunks of source video 214 218 within the 'mdat' box 208. As shown in the example of FIG. 2, there is are separate 'trak' boxes containing the metadata for the audio track and the video track.

In FIG. 2, the source 'stbl' (sample table) boxes 210, within the 'trak' boxes contain sub-tables in the form of boxes that are used to derive the DTS, CTS, frame type, size in bytes, and byte offset in the file for each audio or video frame in the respective track. The entries in each of these sub-tables describe a specific kind of information for each frame or chunk in the respective track. The tables themselves may be compressed within the 'stbl' box using lossless run-level encoding. The 'stts' (decoding time to sample) box 240 contains, for each frame in the track in decoding order, a positive integer value to add to the decoding time stamp (DTS) value for the given frame to obtain the DTS value for the next frame in the track. The 'stts' (composition time to sample) box 242 contains, for each frame in the track in decoding order, an unsigned integer value to add to the decoding time stamp (DTS) value for the given frame to obtain the composition time stamp (CTS) value for the same frame. Note that if there are no B-frames in the video track, the 'ctts' box is typically omitted. An audio track does not typically need a 'ctts' box. The 'stss' (sync sample) box 243 contains one entry for each sync point in the track. Each entry holds the frame number, in decoding order (starting at 1 and incrementing by 1), of a key frame in the track. A video track having only key frames need not have an 'stss' box. An audio track may not need an 'stss' box. The 'stsz' (sample size) box 246 contains, for each frame in the track in decoding order, the number of bytes allocated in the 'mdat' box for the compressed audio or video content of the frame. The 'stsc' (sample to chunk) box 245 contains one entry for each audio or video chunk in this track, in decoding order. Each table entry contains the number of audio or video frames in the corresponding chunk. Finally, the 'stco' (chunk offset) box 244 also contains one entry for each audio or video chunk in this track, in decoding order. Each table entry contains the byte offset (starting at 0) from the start of the MP4 file to the first byte in the corresponding chunk.

In online streaming applications, if reception, transcoding, transmission, and playback are to be overlapped in time so as to minimize latency and jitter, then the contents of the target 'moov' box are constructed and transmitted prior to that of the target 'mdat' box. Prior art techniques utilize source 'stsz' table information for video as a way of assigning target video frame sizes and thus target 'stsz' table entries, but this approach has drawbacks. Some of embodiments of the systems and methods described herein use frame type information which is inferred from the contents of the various sub-table boxes in the source 'stbl' boxes listed above, and compute fixed video frame sizes for each frame type in the target video sequence. For instance, all target I-frames may consist of 4000 bytes of video frame data, all target P-frames may consist of 1000 bytes of video frame data, etc. The way the sizes are computed is described in more detail below.

Like the source 'moov' box 206, the target 'moov' box 230 contains all metadata needed to extract, decode, and reconstruct in composition time order the compressed audio and video stream data stored in the target 'mdat' box. The main difference between the source 'moov' box 206 and target 'moov' box 230 is that target 'moov' box 230 is associated with a transcoded, or recompressed, version of the 'mdat' box 208 contents, represented in FIG. 2 as 'mdat' box 232. Each of the source audio chunks 212 216 etc. and video chunks 214 218 etc. in 'mdat' box 208 is reduced in size to form target audio chunks 222 226 etc. and video chunks 224 228 etc. in 'mdat' box 232 according to certain parameters, as described in more detail below. Briefly, the parameters include frame types associated with the source audio and video chunks 212 214 216 218 etc.

While transcoding affects the size of the target 'mdat' box 232 with respect to the source 'mdat' box 208 (e.g., the target 'mdat' box 232 should be smaller), the target 'moov' box 230 is generally of a similar size to the source 'moov' box 206. Further details regarding the MP4 file format can be found in the "ISO/IEC 14496-14:2003" standard, which is incorporated herein by reference.

Figure 3:
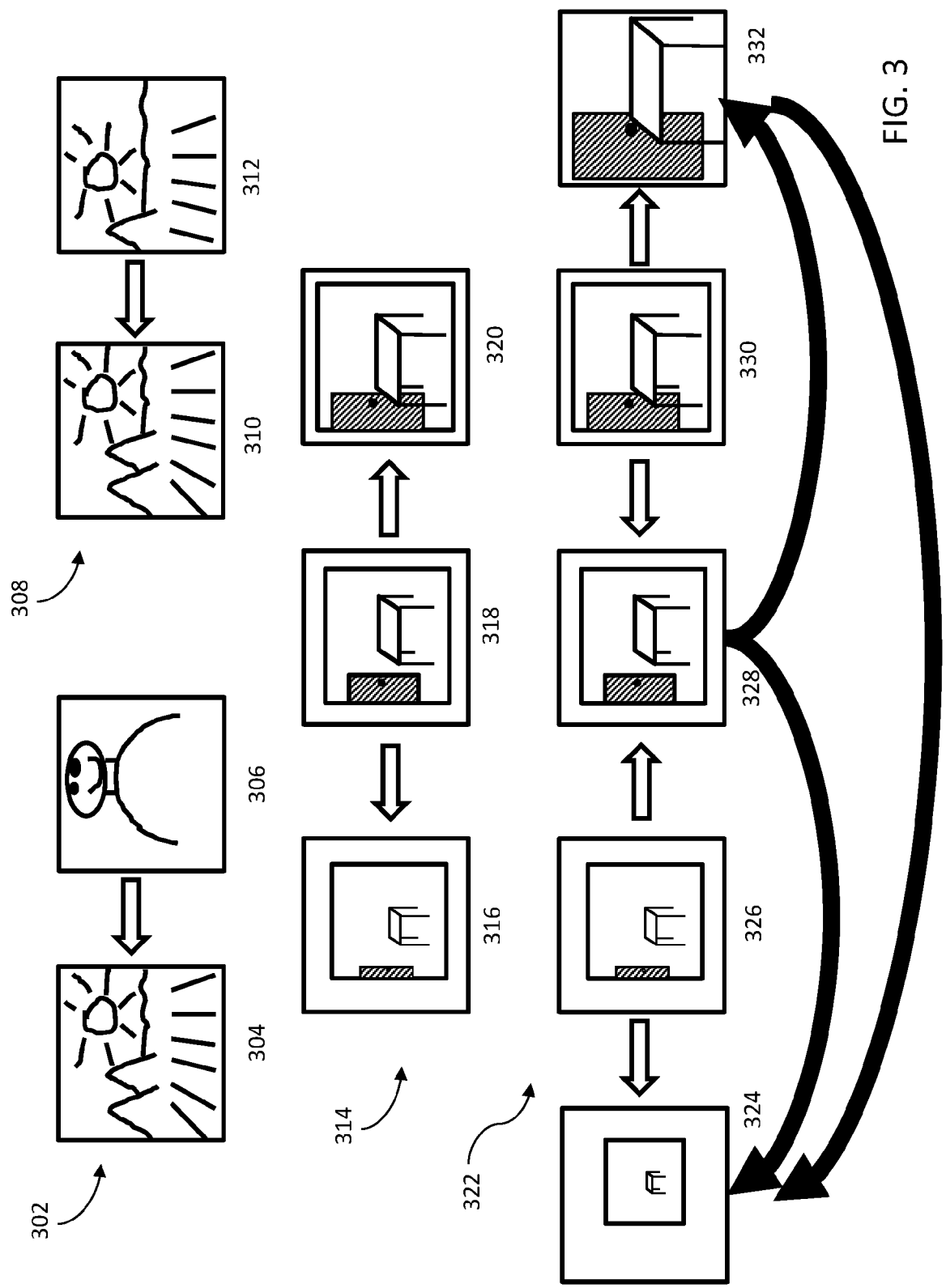
FIG. 3 is a block diagram illustrating frame types, according to some embodiments of the present disclosure.

FIG. 3 is a block diagram illustrating frame types, according to some embodiments of the present disclosure. FIG. 3 shows an example of an intra-coded frame (I-frame) video encoding sequence 302, predicted frame (P-frame) video encoding sequence 308, bi-predictive frame (B-frame) video encoding sequence 314, and bi-predictive reference frame video encoding sequence (B-ref frame) 322.

In some embodiments, video encoding fidelity is maximized when the prediction information is used to construct a frame and only minimal residual or "error signal" information is needed, since error signal information has the highest bit cost of the various types of information to transmit. Different frame types are designed to minimize the cost of sending certain types of prediction information, depending on the correlation of the frame being coded.

In an intra-coded frame (I-frame) video encoding sequence 302, source frame 304 has very little or no correlation with target frame 306. In order to produce the highest fidelity video encoding, there are two encoding techniques that can be utilized due to this observation: first, the best frame transcoding technique to employ 302, is Intra-frame encoding, also known as I-frame, IDR, or Key-frame encoding. Intra-frame encoding is used when there is little or no information to be drawn from other reference frames and the frame is best rendered completely "from scratch". The second encoding technique to employ when there is very little correlation is to increase the frame budget for the encoding of the Intra frame since more bits are needed to produce equivalent quality. There is no additional delay introduced using this encoding type.

The transcoding technique shown in 308 is P-frame coding, which uses a single reference frame 310 to draw upon as a prediction for the current frame 312. This type of frame encoding is best when there is good correlation with prior frames but poor correlation with future frames. There is no additional delay introduced when using this encoding type. As shown in FIG. 3, 312 is somewhat different than 310, but still shares some similar features to 310. A P-frame is typically used in a video when there is panning or scrolling.

The transcoding technique shown in frame encoding sequence 314 is an example of B-frame encoding, which uses reference frames from the past 316 and the future 320 to draw upon as predictors for the current frame 318. This encoding technique is best when there is good correlation with prior and future frames. In the example given, the camera is moving forward through a doorway, so future frames have details that past frames are lacking, and past frames have details that future frames are lacking. Therefore, both are needed to construct the best frame with the least amount of additional residual coding information needed. Additional delay is introduced based on the distance a future frame is from the present frame because time is shifted such that future frames occur at the present real-time.

The transcoding technique shown in frame encoding sequence 322 is an example of B-ref frame encoding, which is similar to B-frame encoding, but can provide higher fidelity in scenes where there are many frames in the past 324 326 and the future 330 332 upon which to draw prediction information. B-ref frame encoding has the advantage of minimizing redundant information when many similar frames occur in a row in a sequence. By constructing a temporal pyramid of frames using B-ref frames, prediction information can be most effectively used while minimizing the amount of residual information needing to be transmitted. Frame encoding sequence 322 is similar to frame encoding sequence 314 in that past and future frames are used, but the diagram shows how a frame from further in the past and the future can be used to construct the intermediate B-ref frame 328, which then can be used as a baseline for constructing B-frames 326 330. In some embodiments, to maximize fidelity, more bits should be allocated to B-ref frame 328, since prediction signals from 328 are then used to construct B-frames 326 330. Additional delay is introduced which tends to be larger than the delay introduced by a B-frame since a pyramid of frames is constructed based on past and future frames, and encoding cannot begin until the future frame is captured.

Note that during transcoding, no additional delay is introduced if the source and target frame-types are matched, since the rearranging of the ordering already took place in the source encoder and frames are simply being processed in the already existing decode order.

Figure 4:
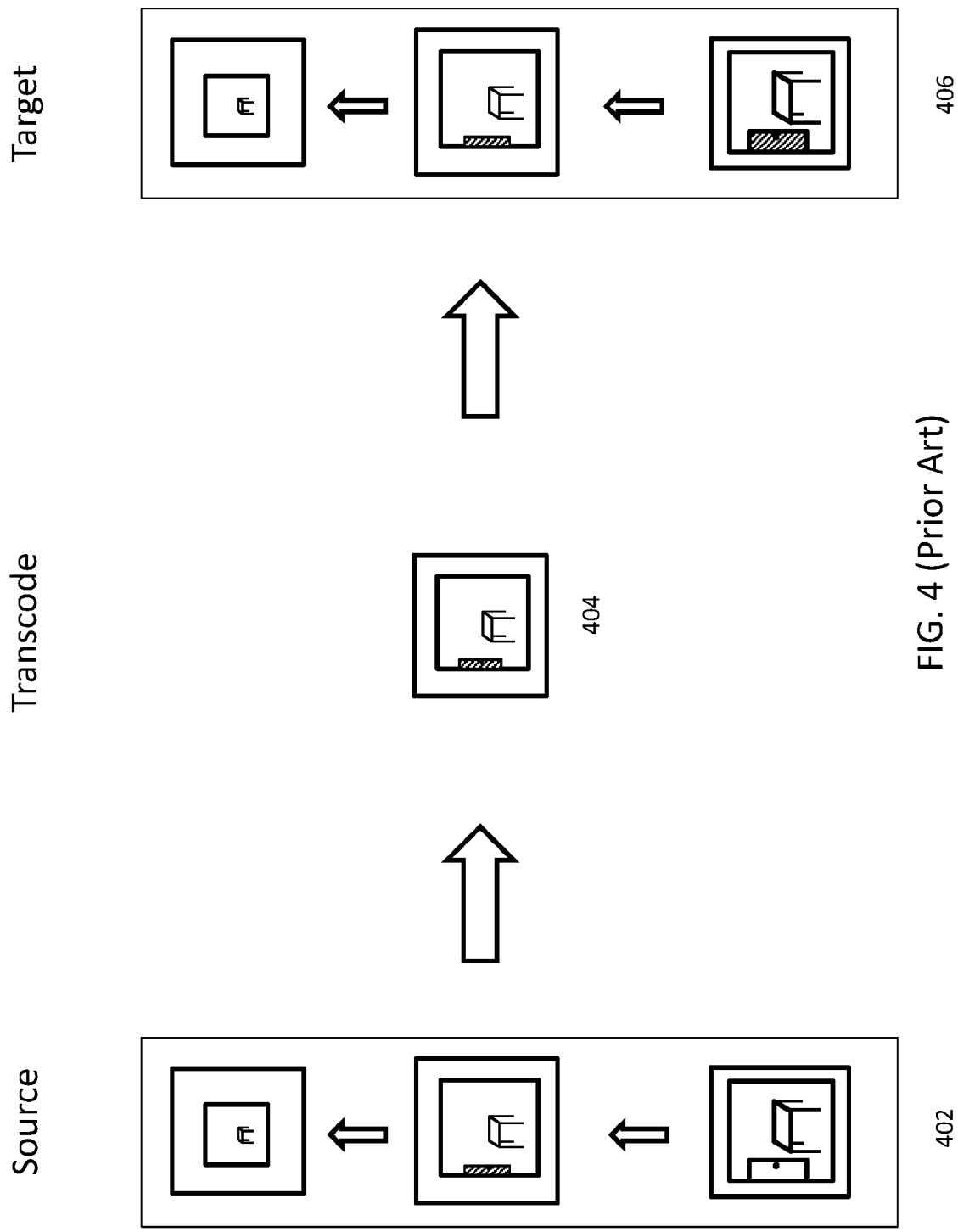
FIG. 4 is a system diagram showing a traditional method of transcoding from a source media file to a target media file.

FIG. 4 is a system diagram showing a traditional method of transcoding from a source media file to a target media file. FIG. 4 shows source frames 402, transcoding 404, and target frames 406.

Traditionally, frames are transcoded in composition order, so if the source sequence 402 has B-frames, they are removed and the sequence is coded with just I and P frames 404 to form the target sequence 406. To remove B-frames, several frames may need to be decoded before the next presented frames is available. But in the simplest embodiment of the present disclosure, frames are always transcoded in decode order, or the order in which they are received. So, if the source material has B-frames, the frame order is preserved and the B-frames are transcoded directly. Therefore, no internal buffering is needed in this case since frames are always processed in the order in which they are received. In other more elaborate embodiments, source frames can be turned into B-frames, and in such a case, internal buffering are needed to queue up mini-group of pictures (mini-GOPs), which are described in more detail below.

Figure 5:
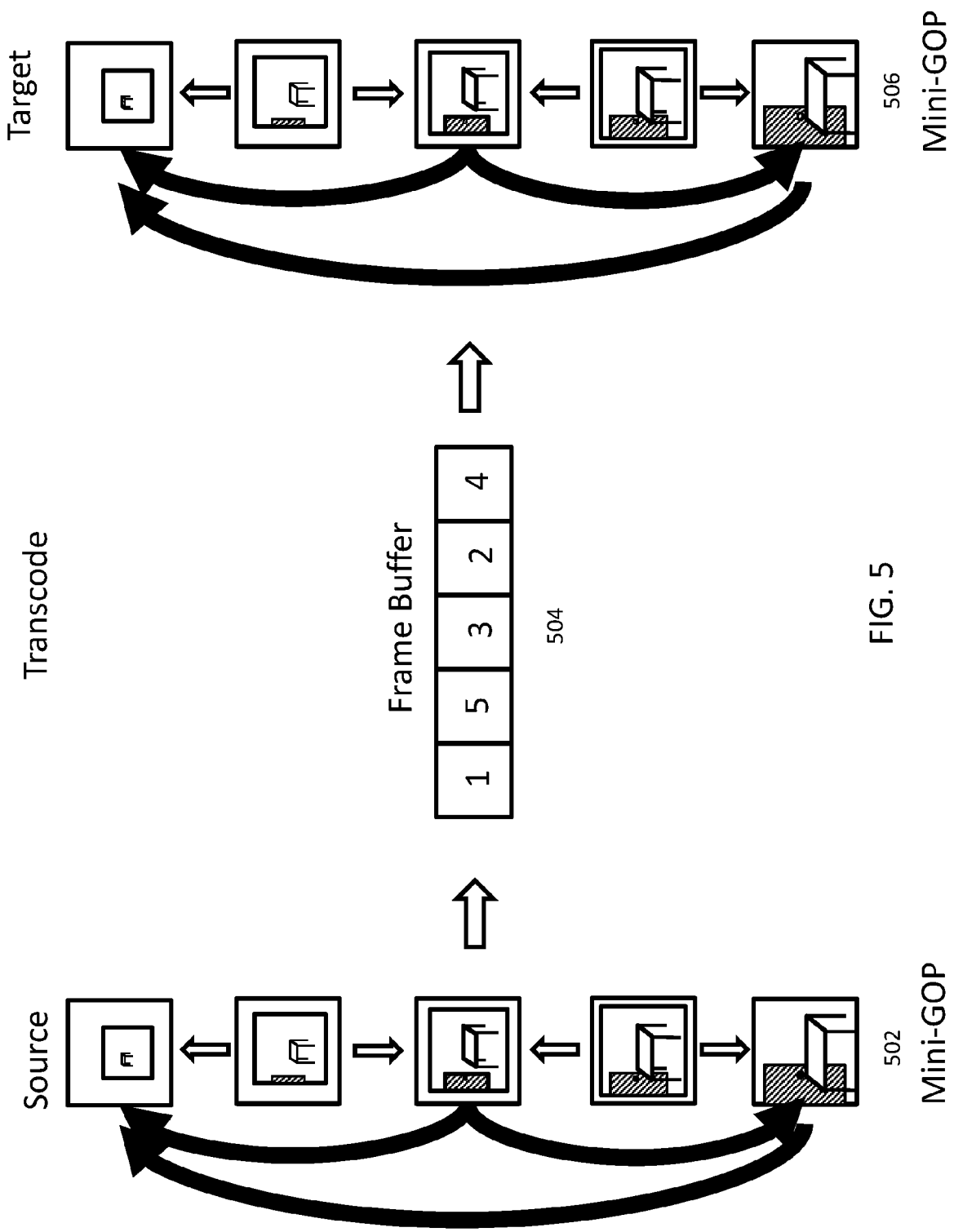
FIG. 5 is a system diagram showing a method of transcoding from a source media file to a target media file using groups of pictures, according to some embodiments of the present disclosure.

FIG. 5 is a system diagram showing a method of transcoding from a source media file to a target media file using groups of pictures, according to some embodiments of the present disclosure. FIG. 5 shows a source mini-group of pictures (mini-GOP) 502, transcoding of the mini-GOP using a frame buffer 504, and a target mini-GOP 506.

In some embodiments, Group Of Pictures (GOP) is similar to a definition of GOP in early video encoding standards to mean all of the frames between I-frames. Since reference frames can be taken from any frame inside a GOP, a mini-GOP 502 is a loosely used term to mean a span of B-frames between two P-frames and/or I-frames, or one span hierarchical coding of frames. The concept of a mini-GOP is often used when B-frames are employed. In one embodiment, the mini-GOP of the source 502 is transcribed to have identical frame-types to the mini-GOP of the target 506. By copying the mini-GOP pattern during 'moov' box transcoding, coding decisions that were made when generating the input stream based on prior and future prediction frame knowledge can be leveraged and reused in the target stream. As described herein, this frame-type knowledge can greatly improve the quality of the video sequence, especially when B-frames are employed. In another embodiment, the source mini-GOP 502 is determined to underutilize B-frames and additional B-frames are inserted in the target mini-GOP 506 to maximize quality. By analyzing the source sequence to determine the maximum mini-GOP length (e.g., the longest run of B-frames), it is possible to determine that the source encoder was unnecessarily constrained. For instance, if the longest run of B- and B-REF frames in a row is 3 frames, then the transcoding engine may enable an additional algorithm that recalculates the frame-type decision so that the longest run of B- and B-ref frames is 5 or 7 frames. The algorithm can analyze frame-type patterns and other information from the source 'moov' box to best determine whether a longer run of B-frames would improve the fidelity for that portion of the video sequence. For instance, if the algorithm determines from the source 'moov' information that a slow pan of the camera was being done, then inserting more B-frames will allow a lower bitrate while maintaining scene fidelity.

In some embodiments, transcoding 504 can include using a frame buffer to change frame-types for the target to be different than the source. When frames are changed to (or from) B or B-REF frames, the decoding order can also change, since B frames need to reference already decoded P frames from a lower and a higher composition time. In order to change the decoding order, a frame buffer 504 can be used to store decoded frames before encoding in the new order. In some embodiments, this frame buffer is the size of the mini-GOP which is being reordered.

Figure 6:
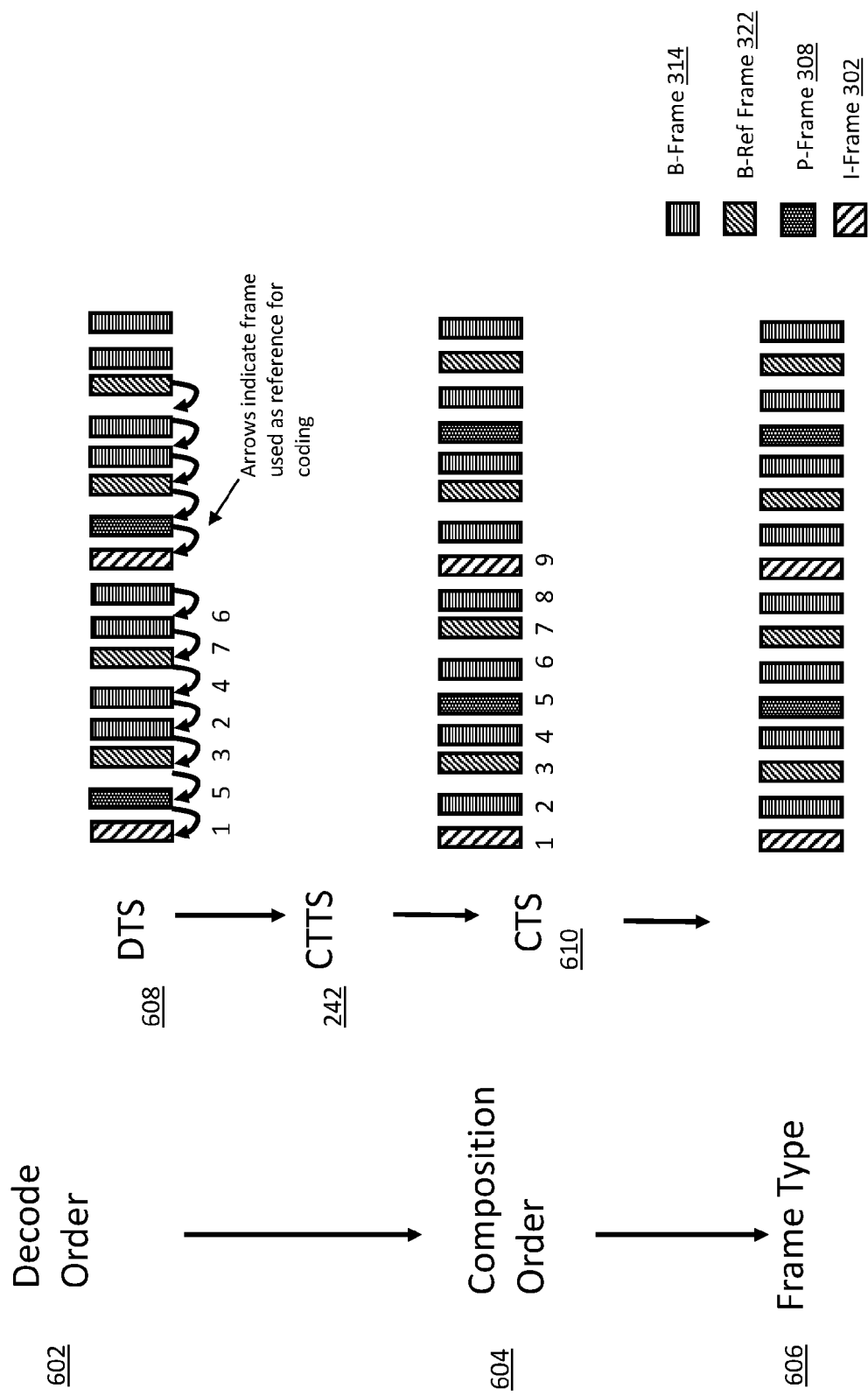
FIG. 6 is a diagram showing a determination of frame type using DTS and CTS, according to some embodiments of the present disclosure.

FIG. 6 is a diagram showing a determination of frame type using DTS, CTTS, and CTS, according to some embodiments of the present disclosure. FIG. 6 shows I-frame 302, P-frame 308, B-frame 314, and B-ref frame 322, CTTS 242, decode order 602, composition order 604, frame type 606, decoding timestamp (DTS) 608, and composition timestamp (CTS) 610.

Decode order 602, represented by the decode time stamp, DTS 608 is the order in which frames are to be encoded, transmitted and decoded. Frames are processed in decode order which removes the non-causality from the encoding process. In some embodiments, no additional delay is introduced during transcoding if the mini-GOP is transcoded from the source since the frames have already been arranged in decode order in the source sequence. Composition order 604 is the order in which frames are captured at the source and presented to the viewer at the destination. This is the actual order of the frames for movement to proceed in linear time. For I-frames and P-frames, no additional delay is incurred, so frame type cannot be inferred based on delay difference between decode time and composition time. However, B-frames and B-ref frames can be inferred due to the lag between decoding time and composition time. Decoding time can be associated with a decoding timestamp (DTS) 608 and composition time can be associated with a composition timestamp (CTS) 610. In a mini-GOP, the B-ref frames are decoded first, and the B-frames are subsequently coded after B-ref frames. In one embodiment, the source mini-GOP may not match the target mini-GOP when multiple B-ref frames are used, but the encoding can still be done without the need for any additional prediction signals. As described in more detail below, frame type 606 can be determined based on the CTS and DTS.

Figure 7:
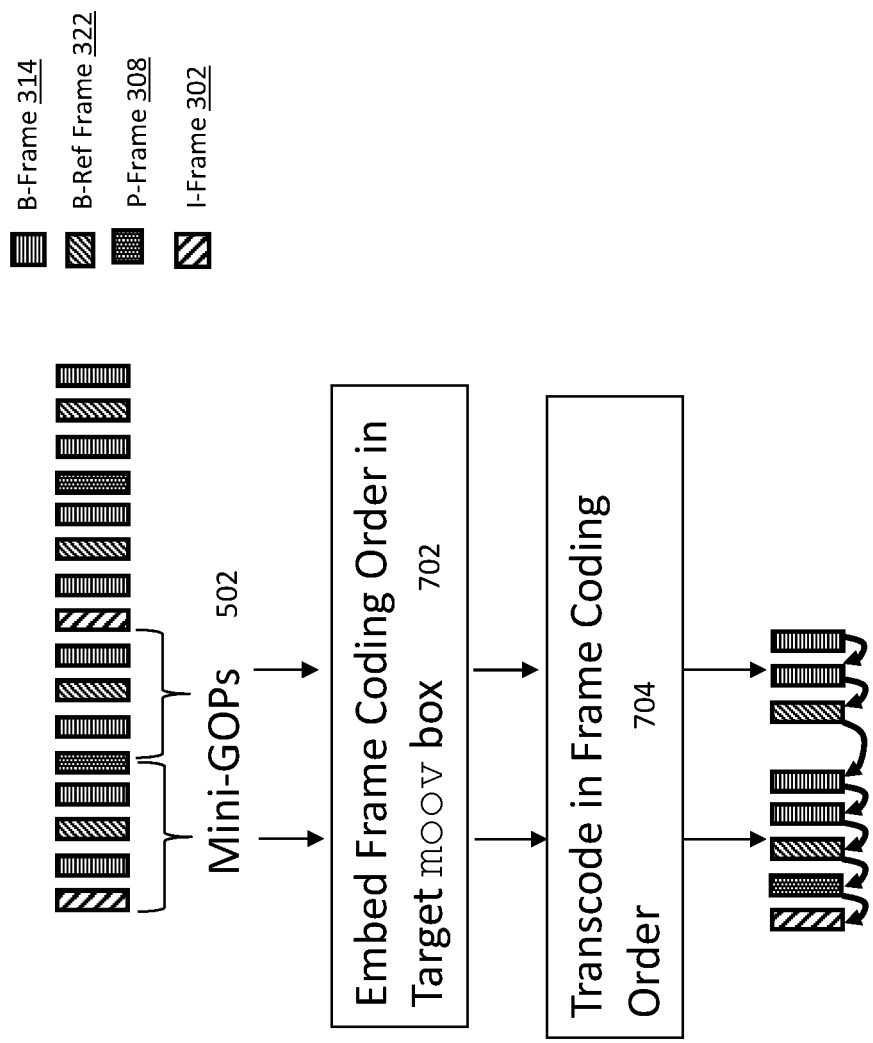
FIG. 7 is a diagram showing a generation of a 'moov' box, according to some embodiments of the present disclosure.

FIG. 7 is a diagram showing a generation of a 'moov', according to some embodiments of the present disclosure. FIG. 7 shows mini-GOPs 502 including at least one of an I-frame 302, P-frame 308, B-frame 314, and B-ref frame 322. FIG. 7 also shows embedding a frame coding order a target 'moov' box 702, and transcoding in frame coding order 704.

All boxes in the 'moov' box give information (position in 'mdat', size, audio or video, etc) in decode order. This is referred to as embedding a frame coding order in a target 'moov' box 702. The box that indicates composition order of video frames is in the 'ctts' box. If there are no B-frames in the sequence, then the 'ctts' box may not be included in the 'moov', since there is no additional information provided in it. The frames are transcoded in the order according to the order in the 'ctts' box 704.

Figure 8:
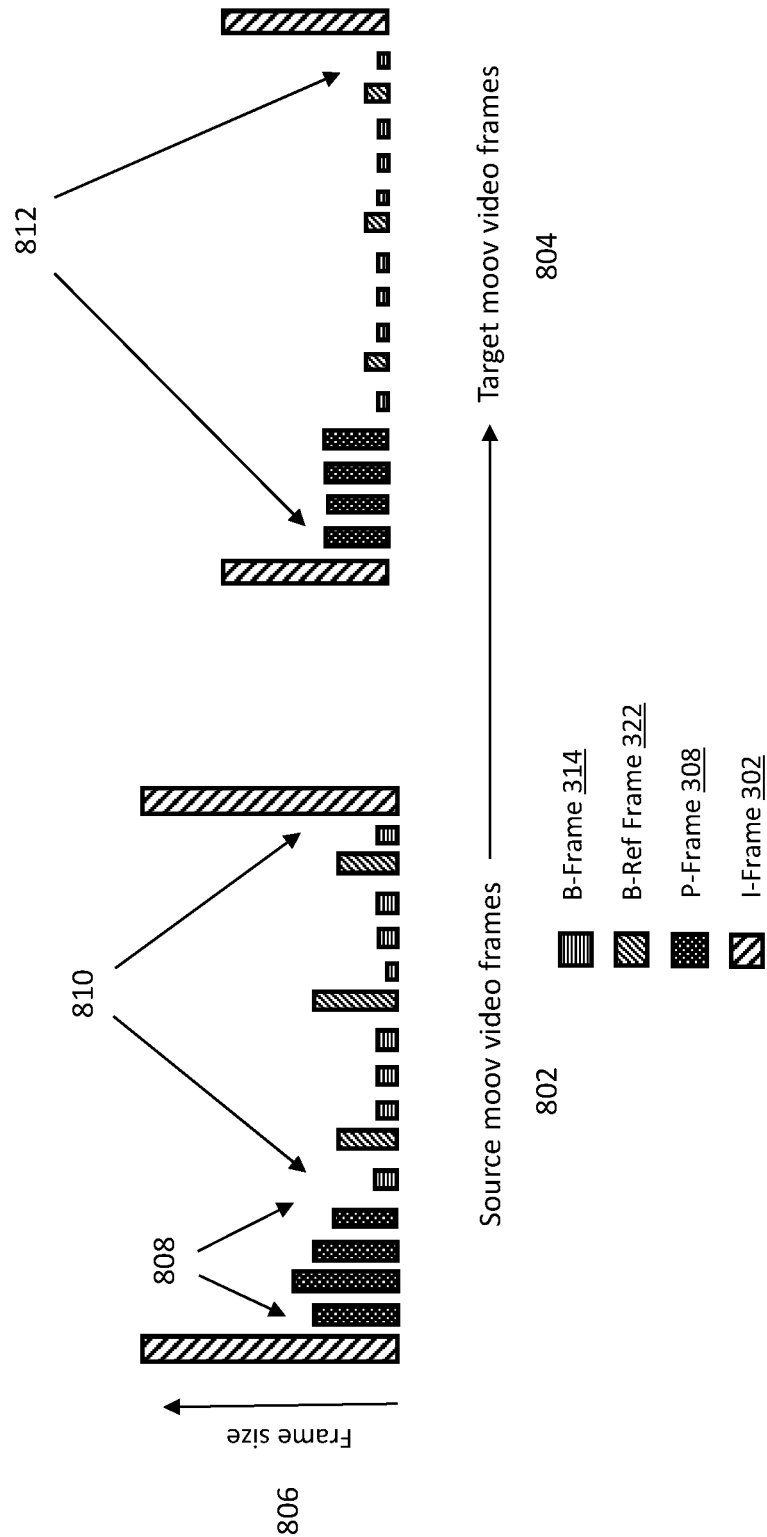
FIG. 8 is a diagram showing video transcoding using frame information, according to some embodiments of the present disclosure.

FIG. 8 is a diagram showing video transcoding using frame information, according to some embodiments of the present disclosure. FIG. 8 shows I-frame 302, P-frame 308, B-frame 314, B-ref frame 322, source 'moov' video frames 802, target 'moov' video frames 804, frame size 806, a group of frames from source 'moov' video frames 808, a group of frames from source 'moov' video frames 810, and a group of frames from target 'moov' video frames 812.

As described above, source 'moov' video frames can include a combination of I-frame 302, P-frame 308, B-frame 314, and B-ref frame 322. Each of I-frame 302, P-frame 308, B-frame 314, B-ref frame 322 are associated with a frame size 806. In general, I-frame 302 has the largest frame size. P-frame 308 and B-ref frame 322 generally have smaller frame sizes than I-frames 302, and B-frame 314 usually has the smallest frame size of the four frame types.

As shown in FIG. 8, a group of frames from source 'moov' video frames 808 includes mostly P-frames. As describe above, a group of P-frames is often associated with a scene with rapid motion, and not suitable for using B-frames. When source video frames 802 are transcoded into target 'moov' video frames 804, the transcoded version 812 of the group of frames from source 'moov' video frames 808 and the group of frames from source 'moov' video frames 810 are efficiently coded while maintaining fidelity. As described above, the scene is efficiently coded because the information the source encoder utilized to determine the best frame type can be reused during transcoding.

Figure 9:
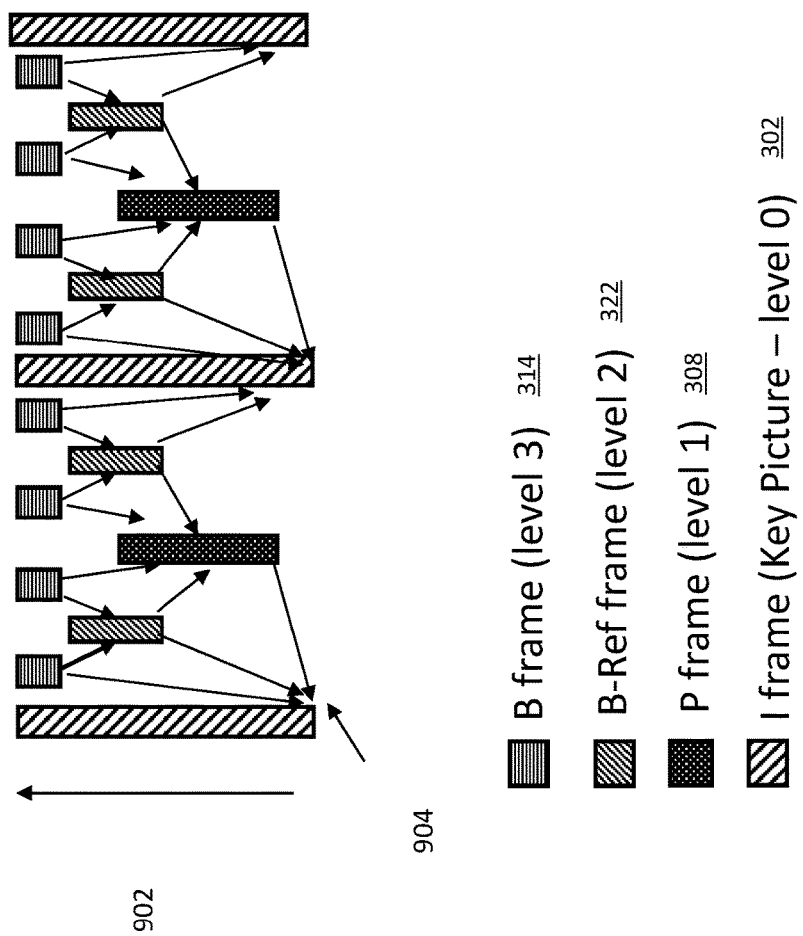
FIG. 9 is a diagram showing hierarchical B-frame coding, according to some embodiments of the present disclosure.

FIG. 9 is a diagram showing hierarchical B-frame coding, according to some embodiments of the present disclosure. FIG. 9 shows I-frame 302, P-frame 308, B-frame 314, B-ref frame 322, temporal hierarchy level 902, and arrows indicating reference frame for coding 904.

As shown in FIG. 9, each of the I-frame 302, P-frame 308, B-frame 314, and B-ref frame 322 are associated with a different temporal hierarchy level 902. Specifically, I-frame 302 is associated with level 0, P-frame 308 is associated with level 1, B-frame 314 is associated with level 3, and B-ref frame 322 is associated with level 2. As explained in more detail below, a quantization parameter is associated with each level, with the quantization parameter increasing with each level. The temporal hierarchy level is based on the number of prediction signals generated by each frame in that level. The greater the number of prediction signals, the lower the level in the hierarchy the frame resides. The arrows 904 indicate prediction signals, so a greater number of arrows pointing to a frame means that frame is used as a reference for a larger number of frames further up the hierarchy. In addition, frames that reference the base frames may also be referenced, which would mean that even more prediction signals are derived from the base frame. Each of I-frame 302, P-frame 308, B-frame 314, and B-ref frame 322 are also associated with a certain size as indicated in the length of the bars (e.g., I-frames are depicted as having greater frame size than other frames).

In some embodiments, most information is sent as motion descriptors in the highest level of the temporal pyramid. This level is where the B-frames are used. Another prediction technique used in B-frames is interpolation of motion vectors used in lower level of the pyramid. For instance if a P-frame and another P-frame have 2 B-frames between them, then the motion vectors used to generate the prediction image in the second P-frame can be exploited to offer intermediate translational vectors for the intermediate B-frames. The first B-frame has positional vectors that are ⅓ of the distance of the vectors in the P-frame, and the second B-frame has positional vectors that are ⅔ of the distance of the vectors in the P-frame. Other techniques which are part of the video standard and known to those practiced in the art allow further interpolation of information, such as interpolation of pixel information between the two P-frames. This utilization of motion information and pixel interpolation allows B-frames to be generated without the need for very much additional residual information. The result is that movement is maintained between high fidelity frames at a minimum coding expense. Further description of out-of-order, hierarchical coding is described in H. Schwarz, D. Marpe, and T. Wiegand, "Analysis of hierarchical B pictures and MCTF," in IEEE Int. Conf. Multimedia and Expo (ICME 2006), Toronto, ON, Canada, July 2006, the contents of which are incorporated by reference. While the techniques described in the Wiegand article to utilize hierarchical B pictures are applied to improve image fidelity, the article does not describe changing quality in different levels of the hierarchy by changing the number of target bits for the frame-types in that hierarchy level. In some embodiments, the advantage of changing the number of target bits to indirectly affect the quantization parameter is that the quantization parameter change between hierarchy levels varies based on scene complexity. That is, if the scene is highly complex, or rapidly changing, the quantization parameter needs to increase rapidly between hierarchy levels (to meet the target bits for that level), so at a constant average bit rate, the quantization parameter is lower at base hierarchy levels relative to the higher levels. This has the effect of linking together the high fidelity base frames so there is more spatial quality at the expense of less temporal fluidity. If on the other hand the scene is relatively straightforward to code, or slowly changing, the quantization parameter changes very little between hierarchy levels, so quality is more evenly distributed across the timespan of the scene. This has the effect of improving temporal fluidity since frames at the highest hierarchy levels are still coded with enough quality to preserve motion accuracy. The self-adjusting nature of this approach improves overall fidelity in varying scene conditions.

In some embodiments, frame type size ratio is determined based on the number of prediction signals generated off the frame. Higher temporal levels have fewer prediction signals and therefore a smaller size. A prediction signal is correlated with a number and amount a frame is used as a reference frame. A prediction signal is generated every time a frame is used as a reference for the coding of another frame. In addition, the prediction signal may have more significance if it is used to generate another frame and that frame is used as a reference for yet another frame. Thus the significance of the temporal pyramid structure: a base level generates the most prediction signals and also has the highest number of frames that are used as a basis for subsequent pyramid levels. For example, B-frames are usually of a smaller size because no prediction signals are generated for B-frames. That is, no other frame references a B-frame. I-frames, in contrast, have the highest number of prediction signals generated and thus it is beneficial from a fidelity standpoint to be associated with a larger frame size.

Figure 10:
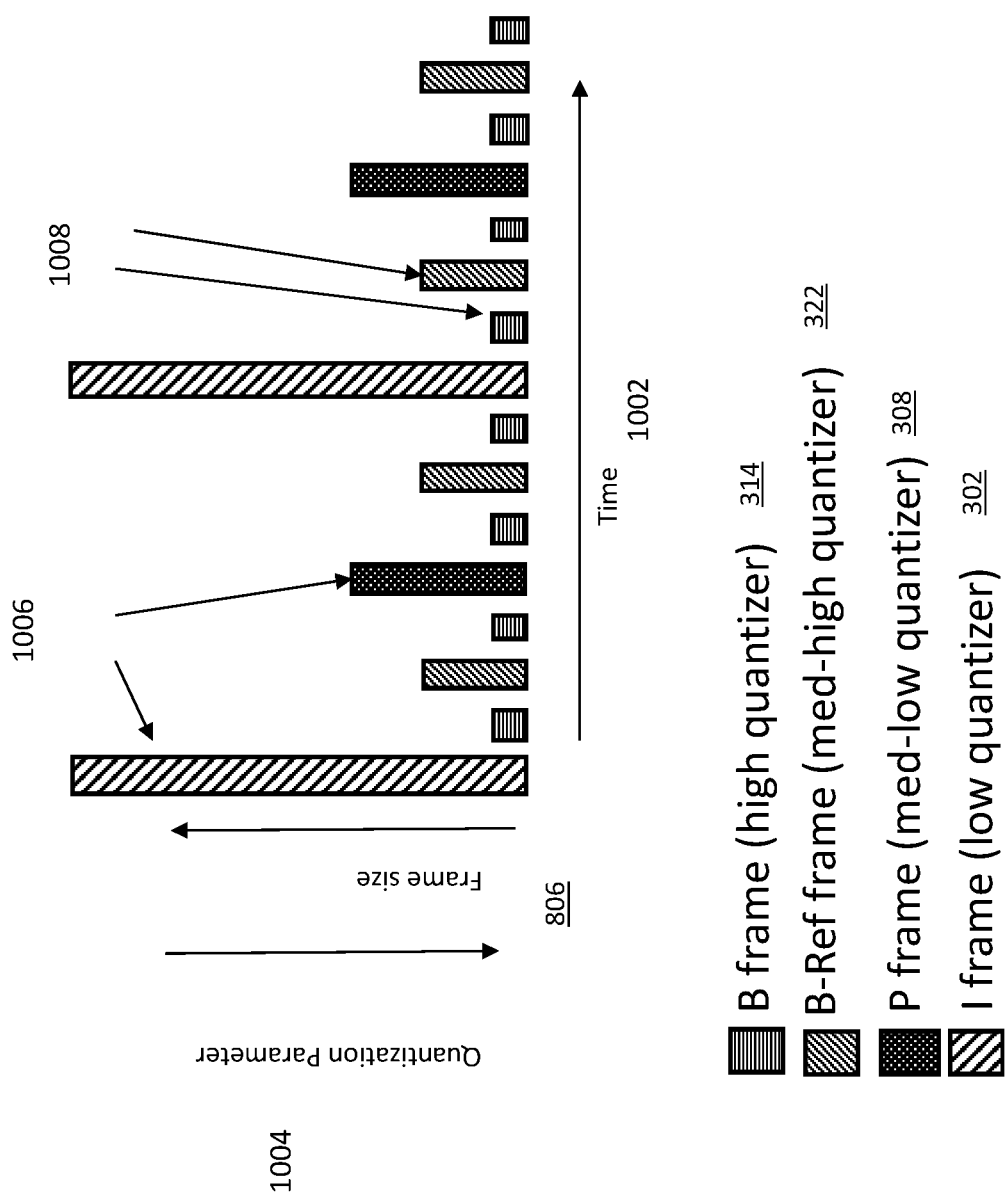
FIG. 10 is a diagram showing a relationship between quantization parameter and frame size, according to some embodiments of the present disclosure.

FIG. 10 is a diagram showing a relationship between quantization parameter and frame size, according to some embodiments of the present disclosure. FIG. 10 shows I-frame 302, P-frame 308, B-frame 314, B-ref frame 322, frame size 806, time 1002, quantization parameter 1004, larger frames 1006 and smaller frames 1008.

As shown in FIG. 10, a series of I-frames 302, P-frames 308, B-frames 314, and B-ref frames 322 are presented over a period of time 1002. Frame size 806 and quantization parameter 1004 are inversely proportional. That is, larger frames 1006 are associated with low quantization levels, and smaller frames 1008 are associated with higher quantization levels. As described above, a quantization parameter is a way to vary the amount of information contained in an image in relation to the amount of encoded information to be transmitted. For instance, if a very coarse quantization parameter is used, a large amount of information is discarded (lossy coding) and less encoded information is transmitted. If a very fine quantization parameter is used, then very little information is discarded and more encoded information is transmitted. The quantization parameter also has an impact on other aspects of coding an image, such as how precisely a motion vector error residual signal is described. An image coded with a coarse quantization parameter has fewer motion vectors representing larger spatial areas, and these motion vectors deviate very little from the prediction signal. Alternatively, an image coded with a fine quantization parameter has many motion vectors, each representing the movement of a small area of the image, and each of these motion vectors describe the deviation from the prediction vector of that small region of the image. From this description, it becomes clear that base frames which are coded with finer quantization parameters can contain more detailed motion information, and higher layers of the temporal pyramid can leverage this motion vector information without the need to describe additional motion.

In some embodiments, an encoder rate control converts frame size to a quantization parameter. Encoder rate control can be a complex algorithm. The basic theory behind rate control is that there is a target number of bits that it is to be desired to be generated for a subset of the image, such as for one row of macroblocks. A quantization parameter can be chosen and the row encoded using the chosen quantization parameter. After the row has been coded, the actual number of bits generated when the row is encoded is compared to the target number of bits. In some embodiments, the row may be re-encoded with a new adjusted quantization parameter to attempt to produce a closer match to the target number of bits. In other embodiments, the row is not re-encoded, but the quantization parameter is adjusted for the subsequent row until convergence is reached between the target number of bits and the actual number generated. Instead of forcing a higher quantization parameter for each temporal level, a smaller frame size can be used, and the rate control algorithm in the encoder can choose a higher quantization parameter to fit the frame within the required target frame size. Therefore, using a ratio of frame sizes between different frame types allows temporal hierarchical coding to maximize fidelity by keeping most coding information in the base levels of the pyramid where the highest number of prediction signals is used, and less coding information in higher levels of the temporal pyramid. This technique also provides dynamic localized adjustments to quality based on the length of each mini-GOP. For example, a long mini-GOP can have fewer bits per frame than a short mini-GOP. Therefore, using source frame-type information allows localized average bitrate to change based on scene content, which can be the basis of high fidelity video encoding.

Figure 11:
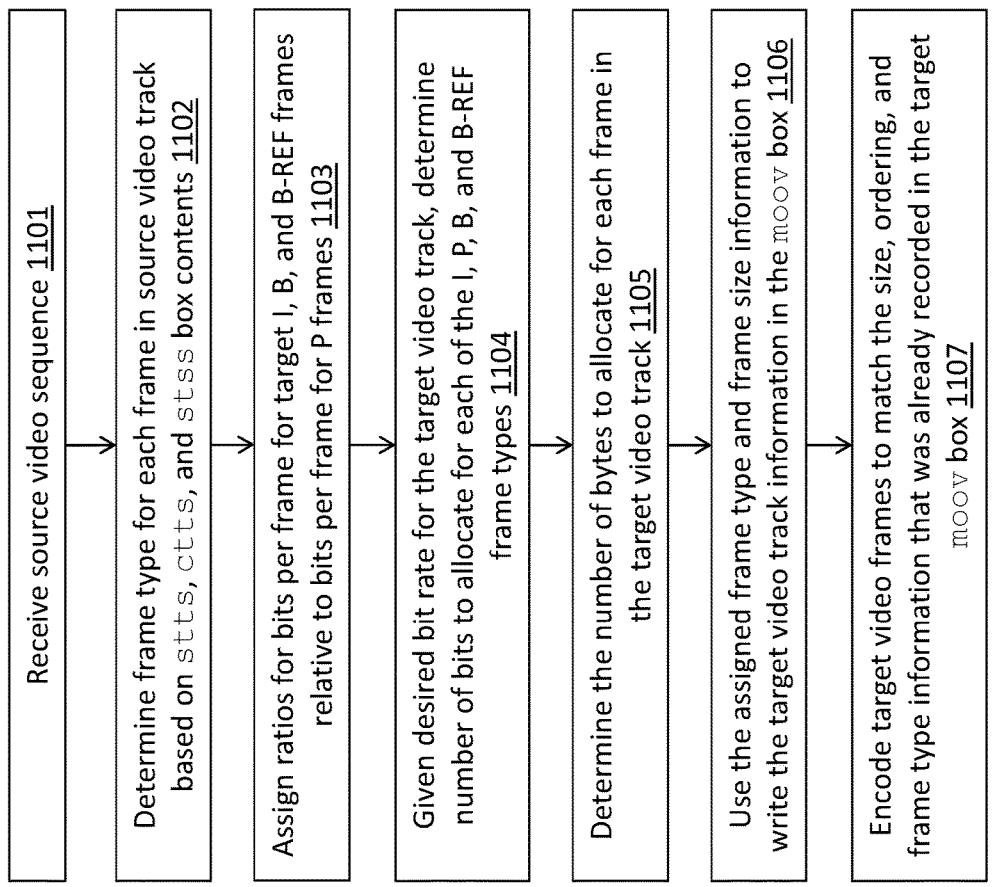
FIG. 11 is a flowchart showing a method for assigning frame sizes in bytes to each frame in the target video sequence, according to some embodiments of the present disclosure.

FIG. 11 is a flowchart showing a method for assigning frame sizes in bytes to each frame in the target video sequence, according to some embodiments of the present disclosure.

Referring to step 1101, a source video sequence is received. As explained above, a video sequence can include one or more video tracks, each track including one or more video frames. In some embodiments, each video sequence includes only one video track (along with one audio track). Also as described above, the source video sequence can be received by a video transcoding engine located in any type of network.

Referring to step 1102 in FIG. 11, based on the table values in the 'stts', 'ctts', and 'stss' box contents in the source video 'stbl' box in the source 'moov' box, frame types from among I, P, B, and B-REF are determined for each source video frame in decoding order, using the procedure described below and illustrated in FIG. 12. Briefly, I, P, B, and B-REF frame types can be determined based on CTS and DTS values. In some embodiments, the target video sequence has the same number of video frames and the same implied playback video frame rate as the source video sequence. Each video frame in the target video sequence can conceptually be assigned the same video frame type as the corresponding source video frame.

Referring to step 1103 in FIG. 11, desired ratios for bits per frame for target I, B, and B-REF frames relative to bits per frame for P frames are assigned. As used herein, $r_I$ refers to the ratio of a size of an I frame as compared to the size of a P frame, $r_B$ refers to the ratio of a B frame as compared to the size of a P frame, and $r_{BREF}$ refers to the ratio of a B-REF frame as compared to the size of a P frame respectively. Specifically, a frame type ratio is computed for a sequence based on a longest mini-GOP length. In some embodiments, the ideal B-frame size ratio is smaller when the mini-GOP is longer. When there tends to be a larger number of B-frames in a row, it is better to provide a higher fidelity reference frame for the B-frames to use as a basis for prediction generation. This means the reference frame is a larger frame, and thus the B-frames by comparison are smaller in size. In some embodiments, if the source sequence has mini-GOPs that contain no B-ref frames, then the B-frames are larger still.

Based on simulation and testing, a correlation between the size of largest mini-gop in the source stream and the ratio of frame sizes in the temporal coding pyramid can be determined. In some embodiments, the simulation and testing consists of encoding a series of video sequences with b_size and bref_size starting at minimum values that are incremented between each run. A quality metric is then used to measure the video quality. In some embodiments, a quality metric includes the median frame peak signal to noise ratio (PSNR) of the difference between source frames and encoded frames. In some embodiments, a median PSNR is used instead of the mean because it eliminates extreme outliers and produces a more realistic measure of overall quality. The run that has the highest median PSNR is determined to be the best quality, and those tuning parameters are the best tuning parameters. During simulation and testing, it was observed that source sequences that have long mini-gop lengths have different best tuning parameters than source sequences that have short mini-gop lengths. Therefore, the mini-gop length can be used to further improve the video quality of the transcoded sequence by using a set of tuning parameters based on the maximum mini-gop length in the sequence. In some embodiments, if the source sequence does not use B-REF frames (used in temporal pyramid coding), then the target sequence will not use pyramid coding and $r_B$ is set to 128/512. In some embodiments, if the source sequence uses B-REF frames, and the longest mini-gop length is less than 4 frames, then $r_B$ is set to 72/512 and $r_{BREF}$ is set to 179/512. Finally, in some embodiments, if the source sequence uses B-REF frames and what is generally considered long mini-gops lengths are used (4 or more frames), then $r_B$ is set to 31/512 and $r_{BREF}$ is set to 128/512.

In some embodiments, if the source material has no B-frames, then the first case (128/512) is used for $r_B$ since there are also no B-REF frames in the sequence.

In some embodiments, the I-frame size can be four times the P-frame size, so that $r_I$ is set to 4.

The code below is exemplary pseudo-code showing how bits per frame ratios are assigned according to the above description. The variable bref_frame_count is set to the number of B-REF frames in the video sequence. The variable max_mini_gop is set to the maximum mini-gop length in the video sequence.

```
r_I = 4;
if (bref_frame_count == 0)
{
    r_B = 128/512;
    r_BREF = 128/512;
}
else if (max_mini_gop < 4)
{
    r_B = 72/512;
    r_BREF = 179/512;
}
else /* max_mini_gop >= 4 */
{
    r_B = 31/512;
    r_BREF = 128/512;
}
```

Referring to step 1104 in FIG. 11, given a desired target bit rate for the target video sequence, the number of bits to allocate for each target video frame type is determined. In some embodiments, these bit allocations preserve: i) The desired bit rate for the target video sequence, ii) The target frame rate for the target video sequence, which is made equal to that of the source video sequence, and iii) the assigned bits per frame ratios, $r_I$, $r_B$, and $r_{BREF}$ defined in the preceding step.

According to some embodiments of the present disclosure, let $b_I$, $b_P$, $b_B$, and $b_{BREF}$ denote the bits per frame values to assign to each of the target video frame types, I, P, B, and B-REF, respectively. In such an embodiment, the following procedure may be used to derive $b_I$, $b_P$, $b_B$, and $b_{BREF}$:

Let $n_I$, $n_P$, $n_B$, and $n_{BREF}$ be the number of I, P, B, and B-REF frames in the source (and target) video sequence, respectively.

Let bps denote the desired bit rate in bits/sec for the target video sequence.

Let fps denote the frame rate in frames/sec for the source (and target) video sequence.

Average bits per frame for the target video sequence is, by definition, given by:

$$bps/fps = (n_I * b_I + n_P * b_P + n_B * b_B + n_{BREF} * b_{BREF})/(n_I + n_P + n_B + n_{BREF})$$

Which can be rewritten as:

$$bps/fps = (n_I * r_I * b_P + n_P * 1 * b_P + n_B * r_B * b_P + n_{BREF} * r_{BREF} * b_P)/(n_I + n_P + n_B + n_{BREF})$$

$b_I$, $b_P$, $b_B$, and $b_{BREF}$ are then expressed as:

$$b_P = ((n_I + n_P + n_B + n_{BREF}) * bps)/(r_I * n_I + n_P + r_B * n_B + r_{BREF} * n_{BREF}) * fps)$$

$$b_I = r_I * b_P$$

$$b_B = r_B * b_P$$

$$b_{BREF} = r_{BREF} * b_P$$

Referring to step 1105 in FIG. 11, the number of bytes to allocate for each frame in the target video sequence is determined by i) the frame type assigned in step 1102 to each target video frame in decoding order, and ii) the bits per frame value assigned in step 1104 to each target video frame type. In some embodiments, a whole number of bytes is assigned to each target video frame since, for example, the MP4 file format expresses frame length in numbers of bytes rather than numbers of bits.

According to some embodiments of the present disclosure, the number of bytes to assign to each target video frame can be determined successively for each frame, in decoding order. In such an embodiment, for the sake of discussion, define the sequences: $\{v_i\}$, $\{t_i\}$, $\{b_i\}$, and $\{B_i\}$, as follows:

$\{v_i\}$ is the sequence of target video frames, in decoding order.

$\{t_i\}$ is a sequence such that $t_i$ is the frame type assigned to frame $v_i$ in step 1102.

$\{b_i\}$ is a sequence such that $b_i$ is the number of bits to be assigned to frame $v_i$.

$\{B_i\}$ is a sequence such that $B_i$ is the number of bytes to be assigned to frame $v_i$.

Firstly, each $b_i$ value is set to the bits per frame value that was determined for frame type $t_i$ in step 1104. Secondly, each successive $B_i$ value is assigned such that the sum of $B_i$ and its predecessor values is the result of converting the sum of $b_i$ and its predecessor values to the nearest whole number of bytes.

The code below is exemplary pseudo-code showing how the byte values of $\{B_i\}$ are derived from the bit values of $\{b_i\}$.

```
int n_bits = 0;      // Running sum of bits allocated to frames
int n_bytes = 0;     // Running sum of bytes allocated to frames
for each successive index i in the sequence
{
  n_bits += b [i];
  int n_bytes_prev = n_bytes;
  n_bytes = round_to_nearest (double (n_bits) / 8);
  B [i] = n_bytes - n_bytes_prev;
}
```

Referring to step 1106 in FIG. 11, the frame type values, assigned in step 1102, and the bytes per frame values, assigned in step 1105, to the target video frames in decoding order, and the frame rate in frames/sec for the source (and target) video sequence, are sufficient to construct the target video track information in the target 'moov' box. Specifically, the 'stts' (decoding time to sample) box (240), the 'ctts' (composition time to sample) box (242), and the 'stss' (sync sample) box (243) in the target video track in FIG. 2 and described earlier, are written in decoding order based on the target frame type and frame rate information. The 'stsz' (sample size) box (246), the 'stsc' (sample to chunk) box (245), and the 'stco' (chunk offset) box (244), also in the target video track in FIG. 2, are written in decoding order based on the target bytes per frame information.

Referring to step 1107 in FIG. 11, the encoded target video frames are written to the target 'mdat' box in decoding order as they become available from the transcoding process shown in FIG. 2. For each target video frame, the byte offset within the target MP4 file and the number of bytes occupied within the target 'mdat' box by the compressed video frame are, in some embodiments, completely consistent with the information that was previously written to the 'stsz', 'stsc', and 'stco' boxes in the video track in the target 'mdat' box.

Referring again to step 1107, in an embodiment of the present disclosure, the encoding process that is used to compress the target video frames that are written to the target 'mdat' box is typically presented video frames to be encoded in composition time order. The compressed frames are typically made available from the encoding process in decoding order, which is the order they need to be written to the target 'mdat' box. For each uncompressed target frame presented to the encoding process, the related frame type and bytes per frame information are also supplied to the encoding process, so as to maintain consistency with the related information already recorded in the video track in the target 'moov' box, and to guarantee that the compressed video frame will be made available from the encoding process in the expected decoding order and will have the expected size in bytes.

Figure 12:
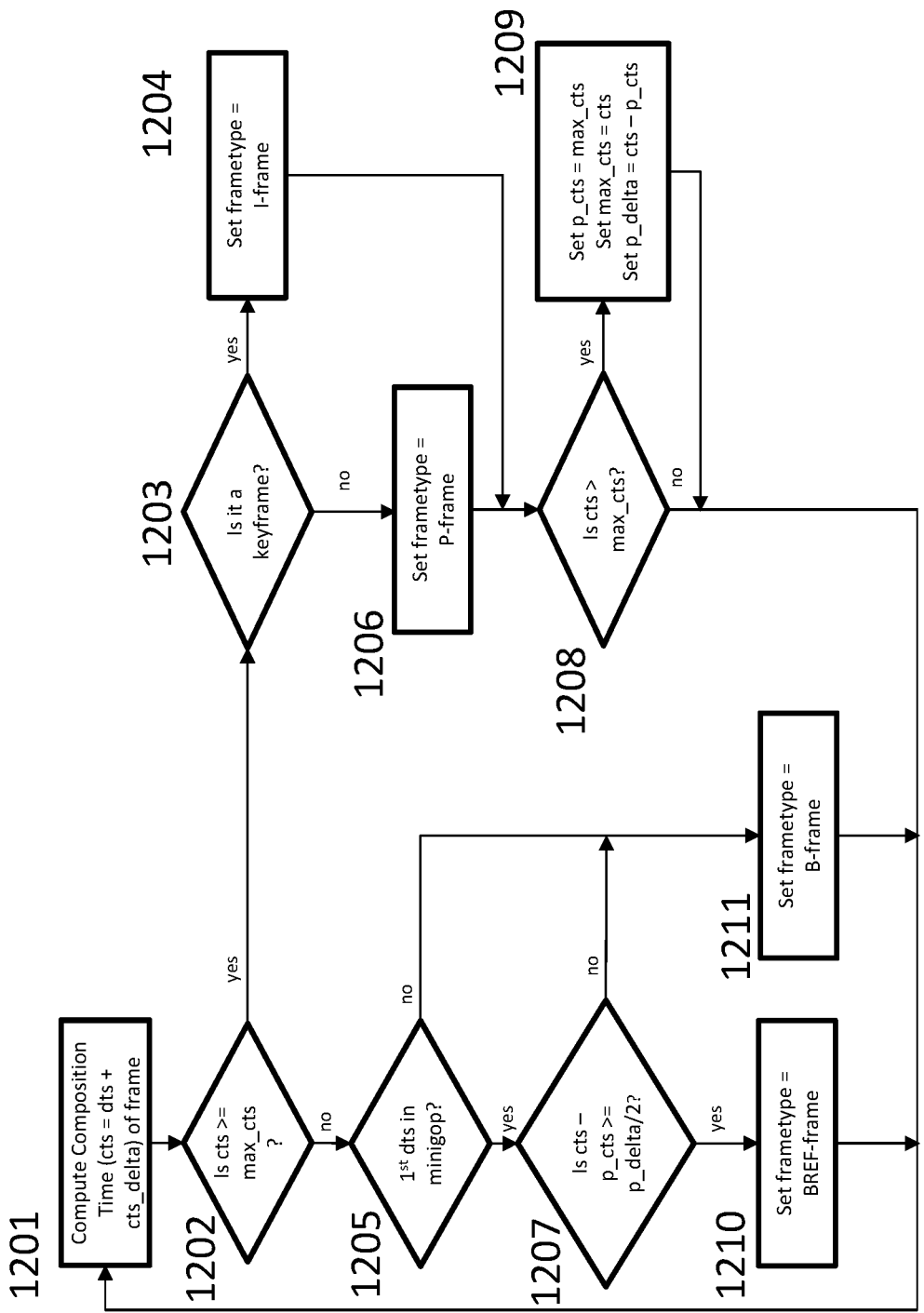
FIG. 12 is a flowchart showing a process for determining frame types of a target media stream based on frame ordering and frame type information of the source media stream, according to some embodiments of the present disclosure.

FIG. 12 is a flowchart showing a process for determining frame types of a target media stream based on frame ordering and frame type information of the source media stream, according to some embodiments of the present disclosure.

The frame type of each video frame in the source media stream is determined based on a differential between DTS and CTS. As described above, as part of the MPEG standard and embedded in the incoming video header, the Decode Time Stamp (DTS) indicates the time at which an encoded video frame should be instantaneously removed from the receiver buffer and decoded. It differs from the Composition Time Stamp (CTS) when picture reordering is used for B pictures. A video encoder can choose to encode a video frame in one of a few different ways depending on which way provides the most efficient compression. If there is little or no temporal correlation with previous frames, the best frame-type is an I-frame. If there is rapid movement such that temporal correlation is weak and disjoint, then the best frame type to use is a P-frame. If there is smooth continuous movement, especially over a large area, then the best frame type to use is the B-frame. Depending on the frame type chosen, video compression efficiency can vary greatly.

According to some embodiments of the present disclosure, the frame type of the source media video frame can be determined by comparing the CTS and DTS of the frame. If an index is given from the Sync Sample or 'stss' box referring to the frame, then it is an I-frame.

Referring to step 1201, a composition time of a frame is calculated (referred to in FIG. 12 and accompanying description as "cts"). In some embodiments, the composition time of a frame is calculated by extracting values from the source 'moov' box information. These values include a Decoding Time To Sample box ('stts') entry value from which is recovered the Decoding Time Stamp (DTS) for each frame (referred to in FIG. 12 and accompanying description as "dts"). In some embodiments, this value is added to a Composition Time To Sample Box ('ctts') entry value (referred to in FIG. 12 and accompanying description as "cts_delta") to produce a composition time (CTS) for the frame (i.e. cts=dts+cts_delta).

Referring to step 1202, if cts is equal to or higher than the current greatest composition timestamp (referred to in this figure and accompanying description as "max_cts"), then the frame is an I-frame or P-frame. In step 1203, the transcoding engine determines whether the current frame is a key frame. In some embodiments, this determination can be made by checking for a presence of an entry for the current frame in the source 'stss' box or dynamically setting every certain number of frames as a key frame. If the frame is a key frame, the frame type is set to I-frame 1204. As used herein, key frame, I-frame and IDR refer to the same frame type. If the frame is not a key frame, the frame type is set to a P-frame 1206. Referring again to 1202, if cts is less than max_cts, then the frame can be a B-frame or a BREF-frame. Referring to step 1205, if the frame is not the first decoded frame in the mini-GOP, the frame type is set to B-frame 1211. If the frame is the first decoded frame in the minigop 1205, at step 1207, it is determined whether the difference between cts and the composition timestamp of a previous P-frame or I-frame (referred to in this figure and accompanying description as "p_cts") is greater than or equal to the difference between composition timestamps of the two frames (P frame or I frame) defining the minigop, divided by 2. In other words, at step 1207, it is determined whether cts minus p_cts is less than half of the duration in composition time associated with the mini-GOP. If at step 1207 the condition is true, then the frame is a BREF-frame frame 1210. If at step 1207, the condition is not true, then the frame is a B-frame 1211. The process then returns to step 1201.

Referring to step 1208, the transcoding engine determines whether cts is greater than max_cts. If cts is greater than max_cts, p_cts is set to max_cts, and max_cts is set equal to cts 1209. In addition, the difference between the composition timestamps of the two frames (P frame or I frame) defining the minigop is saved and assigned to a variable p_delta. The process then returns to step 1201. If cts is not higher than the max_cts, max_cts, p_cts, and p_delta retain their values and the process returns to step 1201.

The logic behind this approach is that B-frames are "bidirectionally predicted frames", which means that there is a non-B-frame on both sides of it: in the future and in the past, off which it is being predicted. Since there is a frame in the future that has already been decoded for a B-frame to exist, then the composition time of a B-frame is always less than the highest currently decoded composition time. Inversely, P-frames which stand for "predicted frames" are only based on reference frames from the past, and since frames are sent in consecutive decode order so as to minimize delay, P-frames will always have the highest decoded timestamp. The same can be said of I frames even though they are not based on any previously predicted frames: delay is minimized if the I frame has the highest decoded timestamp. Exemplary code is provided below to illustrate this process:

```
int minigop_frame_count = 0;
int next_dts = 0;
int max_cts = 0;
int p_delta = 0;
for (int i = 0; i < num_frames; i++)
{
    FrameDesc* pFrameDesc = (*p_frame_list) [i];
    pFrameDesc->dts = next_dts;
    pFrameDesc->cts =
        pFrameDesc->dts + int64_t (pFrameDesc->cts_delta);
    minigop_frame_count++;
    if (pFrameDesc->cts >= max_cts)
    {
        minigop_frame_count = 0;
        if (pFrameDesc->is_key_frame)
        {
            pFrameDesc->frame_type = FRAME_TYPE_I;
        }
        else
        {
            pFrameDesc->frame_type = FRAME_TYPE_P;
        }
    }
    else
    {
        if (minigop_frame_count == 1 &&
            pFrameDesc->cts - p_cts >= (p_delta/2))
        {
            pFrameDesc->frame_type = FRAME_TYPE_BREF;
        }
        else
        {
            pFrameDesc->frame_type = FRAME_TYPE_B;
        }
    }
    if (pFrameDesc->cts > max_cts)
    {
        p_cts = max_cts;
        max_cts = pFrameDesc->cts;
        p_delta = max_cts - p_cts;
    }
    next_dts += int64_t (pFrameDesc->dts_delta);
}
```

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor receives instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of transcoding video sequences for delivery in a mobile network, the method comprising:
    receiving, by a computing device, a source video sequence, the source video sequence comprising a source video track, the source video track including source video frames;
    determining, by the computing device, a source video frame type associated with each of the source video frames based on a differential between a composition time stamp (CTS) and a decoding time stamp (DTS) associated with each of the source video frames, the source video frame types including at least one of:
        a bi-predictive picture frame (B-frame),
        a bi-predictive reference picture frame (B-REF frame),
        an intra-coded frame (I-frame), and
        a predicted frame (P-frame);
    determining, by the computing device, a target frame type associated with each of a plurality of target video frames in a target video track based on the source video frame types;
    calculating, by the computing device, a frame type ratio value for the target frame-types based on a longest mini-GOP length, the mini-GOP length being associated with a number of B-frames and B-REF frames between a first video frame and a second video frame in the plurality of target video frames, the first video frame having a first frame type of a P-frame or an I-frame, and the second video frame having a second frame type of a P-frame or an I-frame;
    determining, by the computing device, a target frame size of each target video frame based on the frame type ratio value and a target transcoding rate; and
    encoding, by the computing device, each of the target video frames in the target video track to the target frame size to form a target video sequence.

2. The computerized method of claim 1, wherein the source video frame type includes:
    a B-frame when:
        the CTS associated with the source video frame is less than a maximum CTS, the maximum CTS associated with a highest CTS of a prior decoded source video frame,
        the source video frame is not a first decoded frame in a mini-GOP, or
        a difference between the CTS and a composition timestamp of a previous P-frame or I-frame is less than the difference between composition timestamps of the first video frame and the second video frame divided by 2;
    a B-REF frame when:
        the CTS associated with the source video frame is less than a maximum CTS,
        the source video frame is a first decoded frame in a mini-GOP, and the difference between the CTS and the composition timestamp of the previous P-frame or I-frame is greater than or equal to the difference between composition timestamps of the first video frame and the second video frame divided by 2;

an I-frame when the CTS associated with the source video frame is greater than the maximum CTS and the source video frame is a keyframe; and a P-frame when the CTS associated with the source video frame is greater than the maximum CTS and the source video frame is not a keyframe.

3. The computerized method of claim 2, further comprising:

when the CTS associated with the source video frame is greater than the highest CTS of the prior decoded source video frame, setting the maximum CTS equal to the CTS associated with the source video frame.

4. The computerized method of claim 1, wherein the frame type ratio value comprises at least one of:

a B-frame ratio value associated with a ratio of a B-frame size compared to a P-frame size;

a B-REF frame ratio value associated with a ratio of a B-REF frame size compared to a P-frame size; and an I-frame ratio value associated with a ratio of an I-frame size compared to a P-frame size.

5. The computerized method of claim 4, wherein the mini-GOP length is inversely proportional to the B-frame ratio value.

6. The computerized method of claim 4, wherein:

the I-frame ratio value is 4;

the B-frame ratio is 128/512 when the longest mini-GOP length is 0;

the B-REF frame ratio is 128/512 when the longest mini-GOP length is 0;

the B-frame ratio is 72/512 when the longest mini-GOP length is less than 4;

the B-REF frame ratio is 179/512 when the longest mini-GOP length is less than 4;

the B-frame ratio is 31/512 when the longest mini-GOP length is greater than or equal to 4; and the B-REF frame ratio is 128/512 when the longest mini-GOP length is greater than or equal to 4.

7. The computerized method of claim 1, wherein determining, by the computing device, the target frame size of each target video frame based on the frame type ratio value and the target transcoding rate further comprises determining a number of bits to allocate to each of the target video frames of the target video track prior to encoding of the target video frames in the target video track.

8. The computerized method of claim 7, wherein determining the number of bits to allocate to each target video frames of the target video track further comprises determining a number of bits in a P-frame in the target video frame, a number of bits in an I-frame in the target video frame, a number of bits in a B-frame in the target video frame, and a number of bits in a B-REF frame in the target video frame, wherein:

the number of bits in the P-frame is equal to $((n_I+n_P+n_B+n_{BREF})*bps)/(r_I*n_I+n_P+r_B*n_B+r_{BREF}*n_{BREF})*fps)$, further wherein $n_I$ is a number of I-frames in at least one of the source video sequence and the target video sequence, $n_P$ is a number of P-frames in at least one of the source video sequence and the target video sequence, $n_B$ is a number of B-frames in at least one of the source video sequence and the target video sequence, $n_{BREF}$ is the number of B-REF frames in at least one of the source video sequence and the target video sequence, bps is the target encoding rate, and fps is a frame rate in frames per second for at least one of the source video sequence and the target video sequence;

the number of bits in the I-frame is equal to the number of bits in the P-frame multiplied by the I-frame ratio value;

the number of bits in the B-frame is equal to the number of bits in the P-frame multiplied by the B-frame ratio value; and the number of bits in the B-REF frame is equal to the number of bits in the P-frame multiplied by the B-REF frame ratio value.

9. A computing system in a mobile network for transcoding video sequences for delivery in the mobile network, the computing system comprising:

a processor; and a memory coupled to the processor and including computer-readable instructions that, when executed by the processor, cause the processor to:

receive a source video sequence, the source video sequence comprising a source video track, the source video track including source video frames;

determine a source video frame type associated with each of the source video frames based on a differential between a composition time stamp (CTS) and a decoding time stamp (DTS) associated with each of the source video frames, the source video frame types including at least one of:

a bi-predictive picture frame (B-frame), a bi-predictive reference picture frame (B-REF frame), an intra-coded frame (I-frame), and a predicted frame (P-frame);

determine a target frame type associated with each of a plurality of target video frames in a target video track based on the source video frame types;

calculate a frame type ratio value for the target frame-types based on a longest mini-GOP length, the mini-GOP length being associated with a number of B-frames and B-REF frames between a first video frame and a second video frame in the plurality of target video frames, the first video frame having a first frame type of a P-frame or an I-frame, and the second video frame having a second frame type of a P-frame or an I-frame;

determine a target frame size of each target video frame based on the frame type ratio value and a target transcoding rate; and encode each of the target video frames in the target video track to the target frame size to form a target video sequence.

10. The computing system of claim 9, wherein the source video frame type includes:

a B-frame when:

the CTS associated with the source video frame is less than a maximum CTS, the maximum CTS associated with a highest CTS of a prior decoded source video frame, the source video frame is not a first decoded frame in a mini-GOP, or a difference between the CTS and a composition timestamp of a previous P-frame or I-frame is less than the difference between composition timestamps of the first video frame and the second video frame divided by 2;

a B-REF frame when:
   the CTS associated with the source video frame is less than a maximum CTS,
   the source video frame is a first decoded frame in a mini-GOP, and
   the difference between the CTS and the composition timestamp of the previous P-frame or I-frame is greater than or equal to the difference between composition timestamps of the first video frame and the second video frame divided by 2;
an I-frame when the CTS associated with the source video frame is greater than the maximum CTS and the source video frame is a keyframe; and
a P-frame when the CTS associated with the source video frame is greater than the maximum CTS and the source video frame is not a keyframe.

11. The computing system of claim 10, wherein when the CTS associated with the source video frame is greater than the highest CTS of the prior decoded source video frame, the processor is further caused to set the maximum CTS equal to the CTS associated with the source video frame.

12. The computing system of claim 9, wherein the frame type ratio value comprises at least one of:
   a B-frame ratio value associated with a ratio of a B-frame size compared to a P-frame size;
   a B-REF frame ratio value associated with a ratio of a B-REF frame size compared to a P-frame size; and
   an I-frame ratio value associated with a ratio of an I-frame size compared to a P-frame size.

13. The computing system of claim 12, wherein the mini-GOP length is inversely proportional to the B-frame ratio value.

14. The computing system of claim 13, wherein:
   the I-frame ratio value is 4;
   the B-frame ratio is 128/512 when the longest mini-GOP length is 0;
   the B-REF frame ratio is 128/512 when the longest mini-GOP length is 0;
   the B-frame ratio is 72/512 when the longest mini-GOP length is less than 4;
   the B-REF frame ratio is 179/512 when the longest mini-GOP length is less than 4;
   the B-frame ratio is 31/512 when the longest mini-GOP length is greater than or equal to 4; and
   the B-REF frame ratio is 128/512 when the longest mini-GOP length is greater than or equal to 4.

15. The computing system of claim 9, wherein to determine the target frame size of each target video frame based on the frame type ratio value and the target transcoding rate the processor is further caused to determine a number of bits to allocate to each of the target video frames of the target video track prior to encoding of the target video frames in the target video track.

16. The computing system of claim 15, wherein to determine the number of bits to allocate to each target video frames of the target video track the processor is further caused to determine a number of bits in a P-frame in the target video frame, a number of bits in an I-frame in the target video frame, a number of bits in a B-frame in the target video frame, and a number of bits in a B-REF frame in the target video frame, wherein:
   the number of bits in the P-frame is equal to $((n_I+n_P+n_B+n_{BREF})*bps)/(n*n_I+n_p+n_B*n_B+r_{BREF}*n_{BREF})*fps)$, further wherein $n_I$ is a number of I-frames in at least one of the source video sequence and the target video sequence, $n_P$ is a number of P-frames in at least one of the source video sequence and the target video sequence, $n_B$ is a number of B-frames in at least one of the source video sequence and the target video sequence, $n_{BREF}$ is the number of B-REF frames in at least one of the source video sequence and the target video sequence, bps is the target encoding rate, and fps is a frame rate in frames per second for at least one of the source video sequence and the target video sequence;
   the number of bits in the I-frame is equal to the number of bits in the P-frame multiplied by the I-frame ratio value;
   the number of bits in the B-frame is equal to the number of bits in the P-frame multiplied by the B-frame ratio value; and
   the number of bits in the B-REF frame is equal to the number of bits in the P-frame multiplied by the B-REF frame ratio value.

17. A non-transitory computer readable medium having executable instructions operable to
   receive a source video sequence, the source video sequence comprising a source video track, the source video track including source video frames;
   determine a source video frame type associated with each of the source video frames based on a differential between a composition time stamp (CTS) and a decoding time stamp (DTS) associated with each of the source video frames, the source video frame types including at least one of:
      a bi-predictive picture frame (B-frame),
      a bi-predictive reference picture frame (B-REF frame),
      an intra-coded frame (I-frame), and
      a predicted frame (P-frame);
   determine a target frame type associated with each of a plurality of target video frames in a target video track based on the source video frame types;
   calculate a frame type ratio value for the target frame-types based on a longest mini-GOP length, the mini-GOP length being associated with a number of B-frames and B-REF frames between a first video frame and a second video frame in the plurality of target video frames, the first video frame having a first frame type of a P-frame or an I-frame, and the second video frame having a second frame type of a P-frame or an I-frame;
   determine a target frame size of each target video frame based on the frame type ratio value and a target transcoding rate; and
   encode each of the target video frames in the target video track to the target frame size to form a target video sequence.

18. The non-transitory computer readable medium of claim 17, wherein the source video frame type includes:
   a B-frame when:
      the CTS associated with the source video frame is less than a maximum CTS, the maximum CTS associated with a highest CTS of a prior decoded source video frame,
      the source video frame is not a first decoded frame in a mini-GOP, or
      a difference between the CTS and a composition timestamp of a previous P-frame or I-frame is less than the difference between composition timestamps of the first video frame and the second video frame divided by 2;
   a B-REF frame when:
      the CTS associated with the source video frame is less than a maximum CTS, the source video frame is a first decoded frame in a mini-GOP, and the difference between the CTS and the composition timestamp of the previous P-frame or I-frame is greater than or equal to the difference between composition timestamps of the first video frame and the second video frame divided by 2;

an I-frame when the CTS associated with the source video frame is greater than the maximum CTS and the source video frame is a keyframe; and a P-frame when the CTS associated with the source video frame is greater than the maximum CTS and the source video frame is not a keyframe.

19. The non-transitory computer readable medium of claim 18, wherein when the CTS associated with the source video frame is greater than the highest CTS of the prior decoded source video frame, the apparatus is further caused to set the maximum CTS equal to the CTS associated with the source video frame.

20. The non-transitory computer readable medium of claim 17, wherein the frame type ratio value comprises at least one of:

a B-frame ratio value associated with a ratio of a B-frame size compared to a P-frame size;

a B-REF frame ratio value associated with a ratio of a B-REF frame size compared to a P-frame size; and an I-frame ratio value associated with a ratio of an I-frame size compared to a P-frame size.

* * * * *

UNITED STATES PATENT AND TRADEMARK OFFICE
CERTIFICATE OF CORRECTION

PATENT NO. : 10,165,310 B2  
APPLICATION NO. : 15/618719  
DATED : December 25, 2018  
INVENTOR(S) : John Sievers et al.

Page 1 of 1

It is certified that error appears in the above-identified patent and that said Letters Patent is hereby corrected as shown below:

In the Claims

Please correct Claim 16 to read as follows:

16. The computing system of claim 15, wherein to determine the number of bits to allocate to each target video frames of the target video track the processor is further caused to determine a number of bits in a P-frame in the target video frame, a number of bits in an I-frame in the target video frame, a number of bits in a B-frame in the target video frame, and a number of bits in a B-REF frame in the target video frame, wherein:

the number of bits in the P-frame is equal to $((n_I + n_P + n_B + n_{BREF}) * bps) / (r_I*n_I + n_p + r_B*n_B + r_{BREF}*n_{BREF}) * fps)$, further wherein $n_I$ is a number of I-frames in at least one of the source video sequence and the target video sequence, $n_P$ is a number of P-frames in at least one of the source video sequence and the target video sequence, $n_B$ is a number of B-frames in at least one of the source video sequence and the target video sequence, $n_{BREF}$ is the number of B-REF frames in at least one of the source video sequence and the target video sequence, bps is the target encoding rate, and fps is a frame rate in frames per second for at least one of the source video sequence and the target video sequence;

the number of bits in the I-frame is equal to the number of bits in the P-frame multiplied by the I-frame ratio value;

the number of bits in the B-frame is equal to the number of bits in the P-frame multiplied by the B-frame ratio value; and the number of bits in the B-REF frame is equal to the number of bits in the P-frame multiplied by the B-REF frame ratio value.

Signed and Sealed this  
Thirtieth Day of April, 2019

Andrei Iancu  
*Director of the United States Patent and Trademark Office*